(12) United States Patent
Fujita

(10) Patent No.: US 8,949,961 B2
(45) Date of Patent: Feb. 3, 2015

(54) CONTROL APPARATUS FOR COMMUNICATING WITH AN IMAGING APPARATUS AND AN AUTHENTICATION INFORMATION ACQUISITION DEVICE, COMMUNICATION SYSTEM, CONTROL METHOD, AND COMPUTER-READABLE STORAGE MEDIUM

(75) Inventor: Fusayuki Fujita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 2029 days.

(21) Appl. No.: 12/008,944

(22) Filed: Jan. 15, 2008

(65) Prior Publication Data

US 2008/0189775 A1 Aug. 7, 2008

(30) Foreign Application Priority Data

Jan. 16, 2007 (JP) .................................. 2007-007496

(51) Int. Cl.
| | |
|---|---|
| G06F 7/04 | (2006.01) |
| G06F 15/16 | (2006.01) |
| G06F 17/00 | (2006.01) |
| H04L 29/06 | (2006.01) |
| G06F 21/34 | (2013.01) |
| G06F 21/60 | (2013.01) |
| G06F 21/83 | (2013.01) |

(52) U.S. Cl.
CPC ................ *H04L 63/08* (2013.01); *G06F 21/34* (2013.01); *G06F 21/608* (2013.01); *G06F 21/83* (2013.01); *G06F 2221/2105* (2013.01); *G06F 2221/2129* (2013.01); *G06F 2221/2141* (2013.01)
USPC .......................................................... 726/7

(58) Field of Classification Search
None
See application file for complete search history.

(56) References Cited

U.S. PATENT DOCUMENTS

| | | | |
|---|---|---|---|
| 7,730,526 B2* | 6/2010 | Lamplough ........................ | 726/9 |
| 2001/0053295 A1* | 12/2001 | Kujirai et al. ................... | 399/79 |
| 2004/0145615 A1* | 7/2004 | Castro et al. .................... | 347/14 |
| 2005/0094195 A1 | 5/2005 | Sakamoto et al. | |

FOREIGN PATENT DOCUMENTS

| | | |
|---|---|---|
| JP | 2003-132022 | 5/2003 |
| JP | 2003-167850 | 6/2003 |
| JP | 2005-026815 | 1/2005 |
| JP | 2006-268577 | 10/2006 |

* cited by examiner

*Primary Examiner* — Nadia Khoshnoodi
(74) *Attorney, Agent, or Firm* — Edwards Wildman Palmer LLP; David G. Conlin; Steven M. Jensen

(57) ABSTRACT

A communication system includes a multifunctional apparatus, an authentication information input device, an I/F converter, and a control server. The control server includes an authentication information input device driver for controlling the operation of the authentication information input device via the I/F converter over a network and a multifunctional apparatus control section for controlling operation of the multifunctional apparatus. The authentication information input device driver causes the authentication information input device to acquire authentication information from a user, and receives, via the network, the authentication information acquired by the authentication information input device. Moreover, in cases where an authenticating section of the control server performs an authentication process with use of the authentication information and authentication is completed successfully, the multifunctional apparatus control section permits the use of the multifunctional apparatus. This makes it possible to build a flexible authentication system.

21 Claims, 23 Drawing Sheets

FIG. 7

INSERT IC CARD

FIG. 8

| ID | IP ADDRESS OF I/F CONVERTER | IDENTIFICATION INFORMATION FOR IDENTIFYING AUTHENTICATION INFORMATION INPUT DEVICE | IDENTIFICATION INFORMATION FOR IDENTIFYING CORRESPONDING DRIVER |
|---|---|---|---|
| 1 | 192.168.0.10 (IP ADDRESS OF I/F CONVERTER 8a) | INPUT DEVICE 7a | IC CARD READER DRIVER |
| 2 | 192.168.0.11 (IP ADDRESS OF I/F CONVERTER 8b) | INPUT DEVICE 7b | FINGERPRINT AUTHENTICATION DEVICE DRIVER |
| 3 | ... | ... | ... |
| ... | | | |

FIG. 16

| IP ADDRESS OF AUTHENTICATION SERVER | IDENTIFICATION INFORMATION FOR IDENTIFYING AUTHENTICATION INFORMATION INPUT DEVICE |
|---|---|
| 192.168.0.30 (IP ADDRESS OF AUTHENTICATION SERVER 4a) | INPUT DEVICE 7a |
| 192.168.0.31 (IP ADDRESS OF AUTHENTICATION SERVER 4b) | INPUT DEVICE 7b |
| ... | ... |
| | |

| USER ID | PASSWORD | AUTHORITY | |
|---|---|---|---|
| | | MULTIFUNCTIONAL APPARATUS | JOB |
| 100001 | Afdjaoijs | 192.168.0.20<br>192.168.0.21 | COPY, PRINT, FAX |
| 100002 | Nczmxbz | 192.168.0.21 | PRINT, SCAN |
| 100003 | Qwiueytq | 192.168.0.20 | COPY |
| ... | | | |

FIG. 20

| CONTROL CONTENT | CONTROL INSTRUCTION (IN ORDER OF INVOCATION) | | | |
|---|---|---|---|---|
| | FIRST | SECOND | THIRD | FOURTH |
| SCAN | JobCreate | ExecuteScan | JobClose | |
| ... | ... | ... | ... | ... |

FIG. 24

```
<html>
<body>
<form class="osa_menu" title="THIS IS TITLE" action="next_page.aspx ">    ...SECTION (A)
    <input id="id_ok"/>
    <input id="id_cancel"/>                                               ...SECTION (B)
    <input id="id_prev"/>
    <input id="id_exit"/>
    <fieldset title="THIS IS PROMPT TEXT">                                ...SECTION (C)
        <input id="btn1" type="submit" title="BUTTON1" />
        <input id="btn2" type="submit" title="BUTTON2" />
        <input id="btn3" type="submit" title="BUTTON3" />
        <input id="btn4" type="submit" title="BUTTON4" />
        <input id="btn5" type="submit" title="BUTTON5" />                 ...SECTION (D)
        <input id="btn6" type="submit" title="BUTTON6" />
        <input id="btn7" type="checkbox" title="BUTTON7" selected='true'/>
        <input id="btn8" type="checkbox" submit" title="BUTTON8" />
    </fieldset>
</form>
</body>
</html>
```

FIG. 25

MENU FORM (DESIGNATED BY class="osa_menu")

| PART INFORMATION | FORMAT TO BE DISPLAYED ON OPERATION SCREEN |
|---|---|
| Title | \<text x='5' y='2' x2='50' y2='8' >THIS IS TITLE\<text> |
| \<input id="id_ok"/> | \<button x='130' y='2' x2='145' y2='8' >OK\<text> |
| \<input id="id_cancel"/> | \<button x='110' y='2' x2='135' y2='8' >CANCEL\<text> |
| \<input id="id_prev"/> | \<button x='90' y='2' x2='105' y2='8' >BACK \<text> |
| \<input id="id_exit"/> | \<button x='70' y='2' x2='85' y2='8' >EXIT\<text> |
|  | \<line x='10' y='15' x2='140' y2='10' > |
| title="THIS IS PROMPT TEXT" | \<text x='5' y='12' x2='20' y2='18'>THIS IS TITLE\<text> |
| \< input id="btn1" BUTTON1 type="submit" | \<text x='20' y='22' x2='65' y2='26'>BUTTON1\<text> |
| ... | ... |

CONTROL APPARATUS FOR COMMUNICATING WITH AN IMAGING APPARATUS AND AN AUTHENTICATION INFORMATION ACQUISITION DEVICE, COMMUNICATION SYSTEM, CONTROL METHOD, AND COMPUTER-READABLE STORAGE MEDIUM

This Nonprovisional application claims priority under 35 U.S.C. §119(a) on Patent Application No. 7496/2007 filed in Japan on Jan. 16, 2007, the entire contents of which are hereby incorporated by reference.

FIELD OF THE INVENTION

The present invention relates to a control apparatus, connected via a network interface to (i) an imaging apparatus for executing a job including at least one of image formation and image processing and (ii) an authentication information acquisition device for acquiring authentication information from a user, which controls the imaging apparatus and the authentication information acquisition device.

BACKGROUND OF THE INVENTION

Among various apparatuses such as multifunctional apparatuses, there is a multifunctional apparatus that, in order to limit its use by an unintended user such as an outsider, authenticates a user and does not become usable until authentication is completed successfully. In order to authenticate a user, such a multifunctional apparatus is provided with an authentication information input device for acquiring authentication information such as an ID and a password from a user. Authentication information acquired by the authentication information input device is compared with pre-registered authentication information held on a user account database. Authentication is completed successfully when the authentication information matches the pre-registered authentication information, and authentication ends up in failure when the authentication information does not match the pre-registered authentication information.

Japanese Unexamined Patent Application Publication No. 132022/2003 (Tokukai 2003-132022; published on May 9, 2003) (Patent Document 1) and Japanese Unexamined Patent Application Publication No. 141313/2005 (Tokukai 2005-141313; published on Jun. 2, 2005) (Patent Document 2) disclose such authentication systems as described above. Patent Document 1 proposes to authenticate a user by comparing fingerprint information with fingerprint information held on a database together with an ID and a password. The fingerprint information is obtained by putting, in a numerical form, the user's fingerprint read with a fingerprint reader incorporated into a cash dispenser. In order for the user to enjoy various services with a single ID and a single password, Patent Document 1 further proposes to authenticate the user with use of a single ID and a single password, and to authenticate the user for each service with use of an ID and a password, acquired from the data base in cases where authentication is completed successfully, which are necessary for authentication unique to that service.

Further, Patent Document 2 proposes to acquire authentication data from a user with use of a numeric keypad provided in a multifunctional apparatus, and to permit or prohibit the use of the multifunctional apparatus in accordance with a result of authentication of the user.

However, the conventional techniques have a problem with their inability to build a flexible authentication system.

Currently, there exist various user authentication systems. Examples of the user authentication systems include a user authentication system to which an ID and a password are inputted, a user authentication system that uses a magnetic card or an IC card, and a user authentication system that uses a physical characteristic such as a fingerprint, a vein, or an iris. Provided in accordance with the types of authentication system are various types of authentication information input device for acquiring authentication information from a user.

However, according to the conventional techniques, an authentication information input device is incorporated into a cash dispenser or a multifunctional apparatus, and a shift to another authentication system is impossible because the authentication information input device is not exchangeable.

Further, even if the authentication information input device is designed to be replaced by another authentication information input device, a shift to another device makes it necessary to also shift to a device driver program for controlling the operation of the device. In order to introduce a new device driver program to a system into which a cash dispenser or a multifunctional apparatus has been incorporated, it is usually necessary to disassemble the apparatus and exchange substrates and ROMs (Read-only memories). This requires time and cost. Such a problem also occurs, for example, in cases where the data format of an IC card has been changed.

Furthermore, such an apparatus often uses a special operating system dedicated to a system into which it is incorporated. This makes it necessary to develop a driver program for each special operating system installed in an individual apparatus.

SUMMARY OF THE INVENTION

The present invention has been made in view of the foregoing problems, and it is an object of the present invention to provide a communication system capable of developing a flexible authentication system and a control apparatus for use in the communication system.

As described above, a control apparatus according to the present invention is a control apparatus capable of communicating via a network interface with (i) an imaging apparatus for executing a job including at least one of image formation and image processing and (ii) an authentication information acquisition device for acquiring, from a user, authentication information necessary for authentication, the control apparatus including: device driver means for controlling operation of the authentication information acquisition device via the network interface so that the authentication information acquisition device acquires authentication information; authentication information receiving means for receiving, from the authentication information acquisition device via the network interface, the authentication information acquired by the authentication information acquisition device; and operation control means for controlling the imaging apparatus in accordance with the authentication information received by the authentication information receiving means.

Further, a control method according to the present invention is a method for controlling, via an network interface, an imaging apparatus for executing a job including at least one of image formation and image processing and an authentication information acquisition device for acquiring, from a user, authentication information necessary for authentication, the method including: a device driver step of controlling operation of the authentication information acquisition device via the network interface so that the authentication information acquisition device acquires authentication information; an authentication information receiving step of receiving, from the authentication information acquisition device via the network interface, the authentication information acquired by the authentication information acquisition device; and an operation control step of controlling the imaging apparatus in accordance with the authentication information received by the authentication information receiving means.

Examples of the "image formation" include printing. Further, examples of the "image processing" include scanning of a document, facsimile, PC facsimile, image conversion, and image correction. Therefore, examples of the "imaging apparatus" include a printer, a copier, a facsimile machine, a PC facsimile machine, an image analysis apparatus, an image correction apparatus, a scanner, and a multifunctional apparatus.

According to the foregoing arrangement, the operation control means of the control apparatus controls the operation of the imaging apparatus via the network interface. Therefore, the imaging apparatus and the control apparatus that controls the operation of the imaging apparatus can be disposed in separate places. Meanwhile, the authentication information acquisition device is not controlled by the imaging apparatus as has conventionally been done, but is controlled by the device driver means of the control apparatus via the network interface. In this way, the authentication information acquisition device is controlled by the control apparatus separate from the imaging apparatus that processes a specific job. This makes it unnecessary to replace a substrate and ROM of the imaging apparatus in changing the arrangement of the authentication information acquisition device. This also makes it unnecessary to develop a device driver program for use in a special operating system dedicated to a system into which the imaging apparatus is incorporated. Therefore, a flexible authentication system can be built.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 7 is a diagram showing an example of a screen that is displayed on an operation panel of the multifunctional apparatus.

FIG. 8 shows an embodiment of the present invention, and shows an example of a first device correspondence table showing a correspondence relationship among the IP address of an I/F converter, identification information for identifying an authentication information input device, and identification information for identifying a device driver program.

FIG. 16 shows another embodiment of the present invention, and is a diagram showing an example of a transmission destination correspondence table (transmission destination storage section) showing a correspondence relationship between the IP address of an authentication server and identification information for identifying an authentication information input device.

FIG. 20 is a diagram showing an example of a control instruction table stored in a control instruction table storage section of the control server.

FIG. 24 is a diagram showing an example of operation screen data.

FIG. 25 is a diagram showing UI data obtained by converting the operation screen data of FIG. 24 into a format suitable for the operation panel of the multifunctional apparatus.

DESCRIPTION OF THE EMBODIMENTS

Embodiment 1

Arrangement of a Communication System

An embodiment of the present invention will be described below with reference to FIGS. 1 through 13. A communication system of the present embodiment authenticates a user with use of an authentication information input device and limits the use of a multifunctional apparatus in accordance with a result of the authentication.

Figure 2:
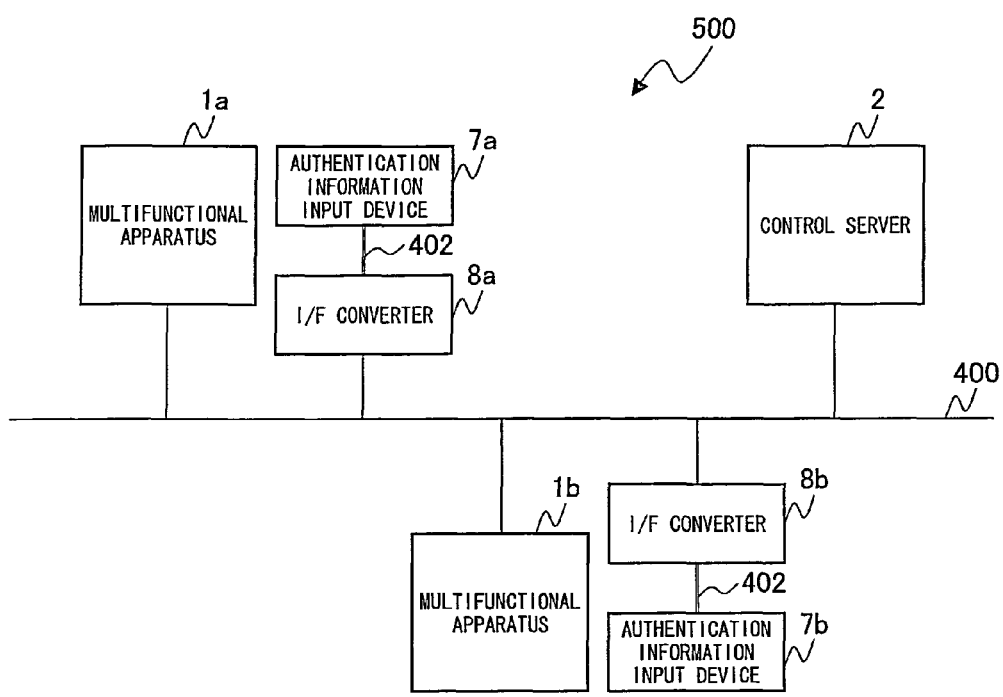
FIG. 2 shows an embodiment of the present invention, and is a block diagram schematically showing an arrangement of a communication system.

FIG. 2 shows an embodiment of the present invention, and is a block diagram schematically showing an arrangement of the communication system. As shown in FIG. 2, the communication system 500 of the present embodiment includes a plurality of multifunctional apparatuses (imaging apparatuses) 1a and 1b, a plurality of authentication information input devices (authentication information acquisition devices) 7a and 7b, and a single control server (control apparatus) 2. The communication system 500 is provided with a network (network interface) 400 that enables the apparatuses and devices to communicate with one another, and each of the apparatuses and devices is connected to the network 400. However, in the present embodiment, the authentication information input devices 7a and 7b are not connected directly to the network 400, but are connected to the network 400 via I/F (interface) converters 8a and 8b, respectively.

As a transmission medium of the network 400, various transmission media can be used. Examples of the transmission media include cable media such as Ethernet®, an optical fiber, and a telephone line or wireless media. Moreover, the present embodiment uses the TCP/IP (Transmission Control Protocol/Internet Protocol) as a communication protocol for the network 400. The TCP/IP is a standard protocol for the Internet or an intranet.

The numbers of multifunctional apparatuses, authentication information input devices, and I/F converters to be contained in the communication system 500 may be 1 or not less than 3. Similarly, the number of control servers 2 is not limited to 1. Further, the multifunctional apparatuses 1a and 1b and the authentication information input devices 7a and 7b only need to be able to communicate with the control server 2, and do not need to be able to communicate with each other.

Each of the multifunctional apparatuses 1a and 1b can execute various jobs including image formation and/or image processing. Examples of jobs including image formation include a print job, and examples of jobs including image processing include a scan job, a color correction job, an image conversion job, a facsimile job, and a PC (personal computer) facsimile job. Furthermore, examples of jobs including a combination of image formation and image processing include a copy job. However, in the communication system 500, the multifunctional apparatus may be replaced by an apparatus (i.e., a printer, a facsimile machine, a PC facsimile machine, a scanner, a copier, or the like) for executing at least one of the jobs. The term "PC facsimile job" here refers to a job of transmitting, with use of a facsimile function, image data received from a PC or the like through a network, and the term "PC facsimile machine" here refers to an apparatus for executing such a PC facsimile job.

Figure 3:
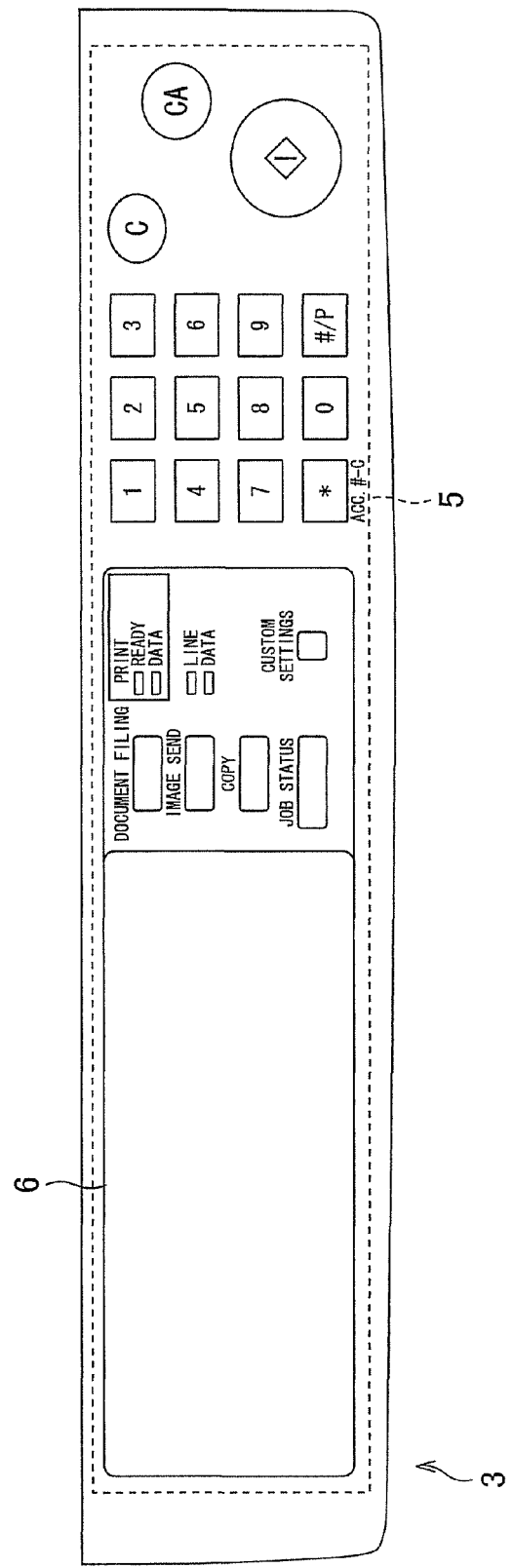
FIG. 3 is an enlarged view of an operation section of a multifunctional apparatus.

Each of the multifunctional apparatuses 1a and 1b includes an operation section 3 as a user interface. FIG. 3 is an enlarged view of the operation section 3. As shown in FIG. 3, the operation section 3 includes an operation panel 6 for showing an operation screen to a user and an input section 5 for receiving a user's input. The operation panel 6 employs a touch panel system, and serves also as an input section 5. The multifunctional apparatus 1 may be connectable to a UI device that either replaces the operation section 3 or serves also as an operation section 3. In this case, the UI device connected to the multifunctional apparatus 1a or 1b displays an operation screen. Further, each of the multifunctional apparatuses 1a and 1b is provided with a network communication substrate so as to be able to communicate with the control server 2, another multifunctional apparatus, or a communication terminal apparatus through the network 400.

Each of the authentication information input devices 7a and 7b is used for acquiring, from a user, authentication information necessary for authenticating the user, and is installed beside a corresponding one of the multifunctional apparatuses 1a and 1b. In the present embodiment, the authentication information input device 7a is installed beside the multifunctional apparatus 1a, and the authentication information input device 7b is installed beside the multifunctional apparatus 1b. The present embodiment is arranged such that in order to use a multifunctional apparatus, the user must input authentication information to an authentication information input device installed beside the multifunctional apparatus and succeed in authentication.

Examples of the authentication information input devices 7a and 7b include a magnetic card reader, an IC card reader, a fingerprint reader, a vein reader, an iris reader, a face reader, a voiceprint reader, a handwriting reader, and the like. In cases where each of the authentication information input devices 7a and 7b is a magnetic card reader or an IC card reader, it acquires a user ID and a password as authentication information from a storage section provided in a card. Alternatively, in cases where each of the authentication information input devices 7a and 7b is a fingerprint reader, a vein reader, an iris reader, a face reader, a voiceprint reader, or a handwriting reader, it acquires fingerprint information, vein information, iris information, face information, voiceprint information, or handwriting information as authentication information from a user. Further, each of the authentication information input devices 7a and 7b may be a keyboard that allows a user to manually input a user ID and a password.

Each of the authentication information input devices 7a and 7b is designed to be connected to a host apparatus in a non-network way such as USB (Universal Serial Bus), Bluetooth®, or RS-232C. The following assumes that the authentication information input devices 7a and 7b are connected to the I/F converters 8a and 8b via USB interfaces (hereinafter referred to simply as USBs) 402, respectively.

Each of the I/F converters 8a and 8b is a so-called USB device server. While the I/F converters 8a and 8b are connected to the authentication information input devices 7a and 7b via the USBs 402, respectively, the I/F converters 8a and 8b are connected to the control server 2 through the network 400. The I/F converters 8a and 8b serve as relay apparatuses that receive data transmitted from the control server 2 through the network 400 and transmit the data to the authentication information input devices 7a and 7b via the USBs 402, and that receive data from the authentication information input devices 7a and 7b via the USBs 402 and transmit the data to the control server 2 through the network 400.

In relaying data, each of the I/F converters 8a and 8b converts network packet data according to a network protocol (TCP/IP in this case) into USB packet data according to a USB communication protocol, and vice versa. In the former process, the I/F converter 8*a* or 8*b* adds header information to the USB packet data. For example, the header information contains source and destination IP addresses necessary for communication over the network 400. Then, the I/F converter 8*a* or 8*b* divides the packet into parts each having a predetermined size. In this way, the I/F converter 8*a* or 8*b* creates TCP/IP packet data. In the latter process, the I/F converter 8*a* or 8*b* rearranges a TCP/IP packet, removes unnecessary header information such as IP addresses, and creates USB packet data acceptable to the authentication information input device 7*a* or 7*b*.

The control server 2 is constituted by an ordinary personal computer (e.g., IBM PC/AT compatible machine), and a general-purpose Windows® system, Linux, or the like can be used as an operating system for the personal computer. The present embodiment assumes an example where a Windows® system is used. The control server 2 is connected to the network 400, and has the following three main functions of: (1) controlling each of the authentication information input devices 7*a* and 7*b* so that it acquires authentication information from a user; (2) authenticating the user after receiving the authentication information acquired by the authentication information input device 7*a* or 7*b*; and (3) controlling the operation of the multifunctional apparatus 1*a* or 1*b* in accordance with a result of the authentication.

In the communication system 500 of the present embodiment, neither of the multifunctional apparatuses 1*a* and 1*b* executes a job on its own. Instead, each of the multifunctional apparatuses 1*a* and 1*b* is arranged so as to execute a job under the control of the control server 2. That is, a job execution instruction received from a user via the operation panel 6 of the multifunctional apparatus 1*a* or 1*b* is transmitted to the control server 2 first, and the multifunctional apparatus 1*a* or 1*b* executes the job in accordance with a control command transmitted from the control server 2. Further, each screen (a screen indicating an authentication result or an operation screen) to be displayed on the operation panel 6 of each of the multifunctional apparatuses 1*a* and 1*b* is also created in accordance with screen data transmitted from the control server 2.

(Arrangement of the Control Server)

Figure 4:
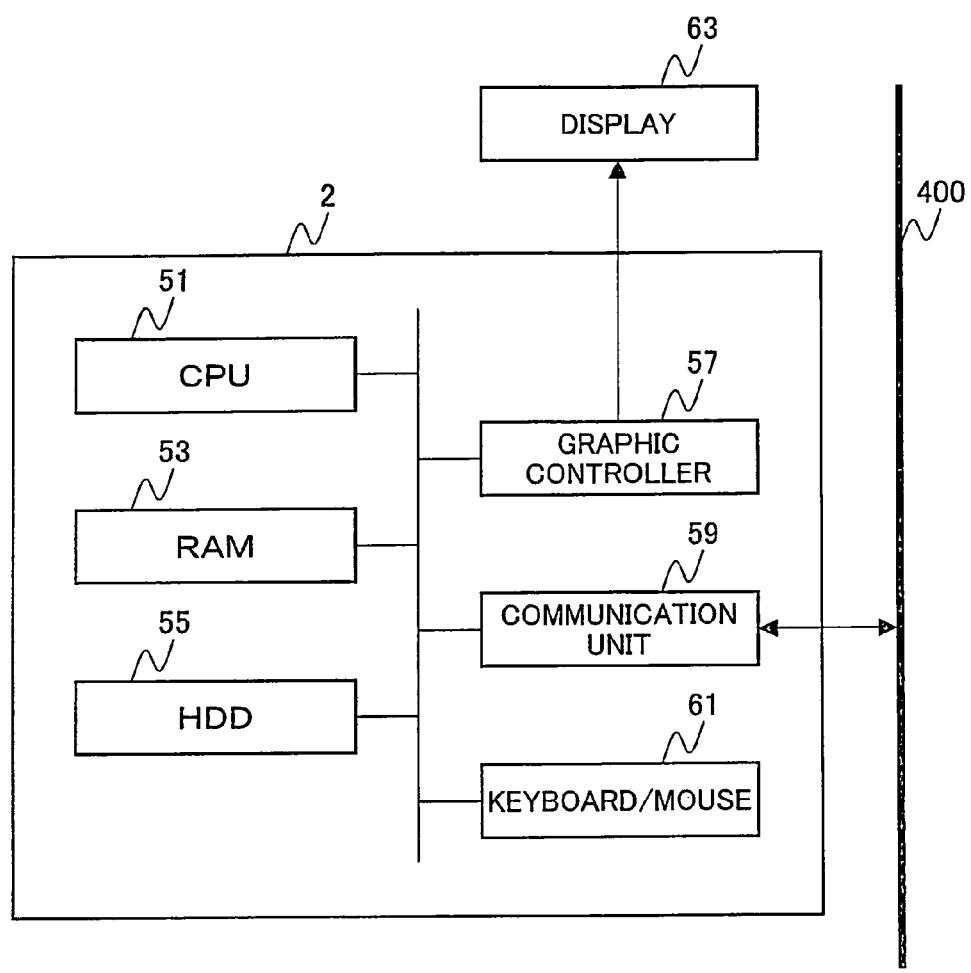
FIG. 4 shows an embodiment of the present invention, and is a block diagram showing a hardware arrangement of the control server.

FIG. 4 shows an embodiment of the present invention, and is a block diagram showing a hardware arrangement of the control server 2. As shown in FIG. 4, the control server 2 includes a CPU (Central Processing Unit) (computer) 51, a RAM (Random-access Memory) 53, an HDD (Hard-disk Drive) 55, a graphic controller 57, a communication unit 59, a keyboard/mouse 61, and the like. Moreover, the graphic controller 57 is connected to a display 63. Further, the communication unit 59 is connected to the network 400.

The control server 2 loads, onto the RAM 53, various programs stored on the HDD 55. The execution of the programs by the CPU 51 causes the control server 2 to fulfill various functions. Further, the control server 2 notifies a user of various types of information by various screens that the graphic controller 57 causes the display 63 to display, and the communication unit 59 allows the control server 2 to communicate with the apparatuses and devices (e.g., multifunctional apparatuses 1*a* and 1*b* and I/F converters 8*a* and 8*b*) connected to the network 400. Further, the keyboard/mouse 61 enables the user to input various types of information to the control server 2.

Figure 1:
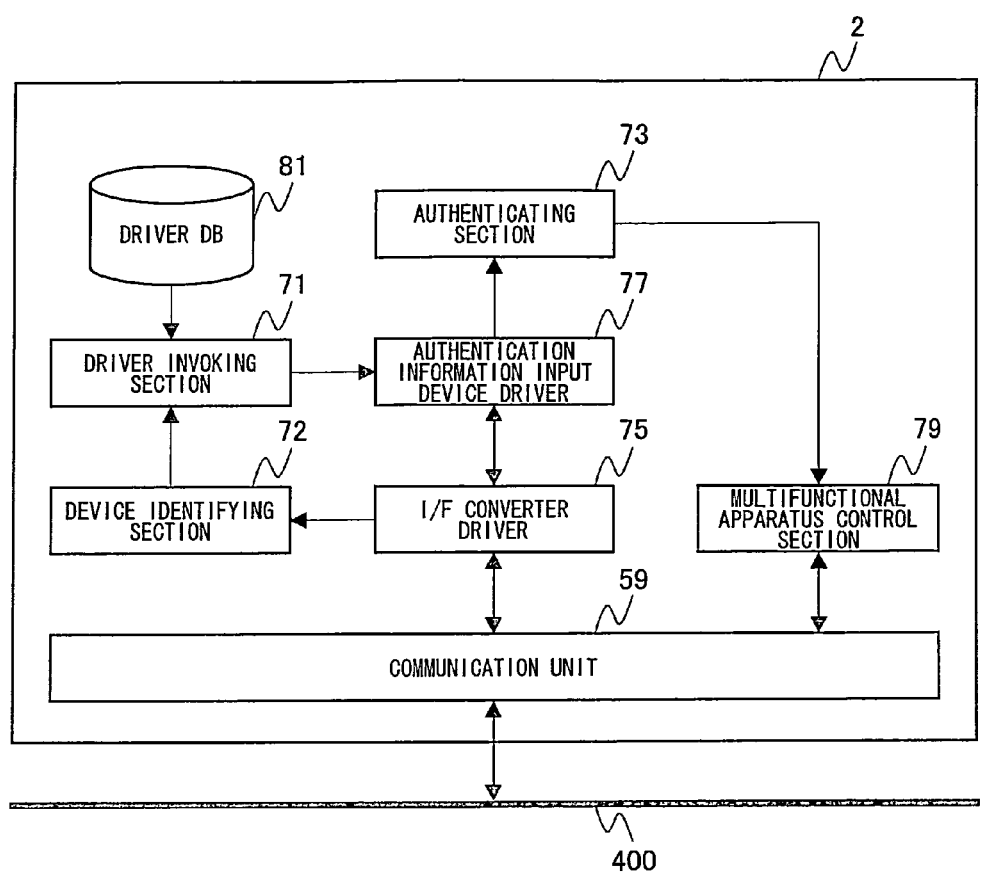
FIG. 1 shows an embodiment of the present invention, and is a block diagram showing a functional arrangement of a control server.

FIG. 1 shows an embodiment of the present invention, and is a block diagram showing a functional arrangement of the control server 2. As shown in FIG. 1, the control server 2 includes the following functional blocks: authentication information input device driver (device driver means, authentication information receiving means, command generating means) 77, an I/F converter driver (device driver means, packet converting means, command transmitting means) 75, a device identifying section (device identifying means) 72, a driver database (program storage section) 81, a driver invoking section (driver invoking means) 71, an authenticating section (authenticating means) 73, and a multifunctional apparatus control section (operation control means) 79.

The authentication information input device driver 77 and the I/F converter driver 75 are drivers for controlling the operation of the authentication information input devices 7*a* and 7*b*. More specifically, the authentication information input device driver 77 is a driver for controlling the authentication information input devices 7*a* and 7*b*, and the I/F converter driver 75 is a driver for controlling the I/F converters 8*a* and 8*b*.

Specifically, the authentication information input device driver 77 has (i) a function of generating USB packet data containing control commands for instructing the authentication information input device 7*a* or 7*b* to read authentication information and for controlling the operation of each component of the authentication information input device 7*a* or 7*b* and (ii) a function of extracting user authentication information by interpreting data transmitted from the authentication information input device 7*a* or 7*b*.

Meanwhile, the I/F converter driver 75 performs the same packet conversion process as the I/F converters 8*a* and 8*b* do. Specifically, the I/F converter driver 75 converts, into TCP/IP packet data that can be distributed through the network 400, USB packet data generated by the authentication information input device driver 77. In so doing, the I/F converter driver 75 adds, to the USB packet data, head information such as IP addresses necessary for communication over the network 400, and divides the packet into parts each having a predetermined size, thereby creating TCP/IP packet data. The TCP/IP packet data thus created is transmitted to the I/F converter 8*a* or 8*b* through the network 400 by the communication unit 59.

Further, the I/F converter driver 75 converts, into USB packet data that can be interpreted by the authentication information input device driver 77, TCP/IP packet data received from the authentication information input device 7*a* or 7*b* through the I/F converter 8*a* and 8*b*, the network 400, and the communication unit 59. In this case, the conversion process is a reversal of the aforementioned process of converting USB packet data into TCP/IP packet data.

In the present embodiment, the I/F converter driver 75 and the aforementioned I/F converters 8*a* and 8*b* enable the control server 2 and the authentication information input devices 7*a* and 7*b* to communicate with each other regardless of differences in communication interface, thereby enabling the control server 2 to control the authentication information input devices 7*a* and 7*b* over the network 400.

The device identifying section 72 identifies, when the authentication information input device 7*a* or 7*b* has transmitted data to the control server 2, which of the authentication information input devices 7*a* and 7*b* has transmitted authentication information. The driver database (driver DB) 81 stores a device driver program for controlling the authentication information input devices 7*a* and 7*b*. In cases where the authentication information input devices 7*a* and 7*b* employ different types of system, the driver DB 81 stores device driver programs that are respectively used for the devices. That is, the number of device driver programs to be stored in the driver DB 81 corresponds to the number of types of authentication information input device.

The driver invoking section 71 chooses, from among a plurality of device driver programs stored in the driver DB 81, a device driver program appropriate for an authentication information input device identified by the device identifying section 72, loads the chosen program onto the RAM 53, causes the CPU 51 to execute the program, and causes the CPU 51 to function as the authentication information input device driver 77. This enables the authentication information input device driver 77 to appropriately control an authentication information input device where an input event has occurred.

The authenticating section 73 has a user account database, and authenticates a user by making a comparison between authentication information acquired from the user by the authentication information input device 7a or 7b and authentication information registered on the user account database.

The multifunctional apparatus control section 79 controls the operation of the multifunctional apparatuses 1a and 1b in accordance with a result of authentication performed by the authenticating section 73. This control operation is performed over the network 400 by the multifunctional apparatus control section 79 controlling the communication unit 59. Specific examples of a control operation that is performed by the multifunctional apparatus control section 79 in accordance with an authentication result include: (1) a control operation of permitting the multifunctional apparatus 1a or 1b to execute a job or prohibiting the multifunctional apparatus 1a or 1b from executing a job; (2) a control operation of notifying a user of the multifunctional apparatus 1a or 1b, permitted as a result of authentication to use a job, that the job can be used; and (3) a control operation of causing the operation panel 6 of the multifunctional apparatus 1a or 1b to display a result of user authentication. In addition to these control operations, the multifunctional apparatus control section 79 performs various operations of controlling the multifunctional apparatuses 1a and 1b. Other examples of a control operation that is performed by the multifunctional apparatus control section 79 will be described later.

The functional blocks of the control server 2, or the driver invoking section 71, the device identifying section 72, the authenticating section 73, the I/F converter driver 75, the authentication information input device driver 77, and the multifunctional apparatus control section 79 in particular, can be realized by software with use of the CPU 51.

That is, the control server 2 includes: (i) the CPU 51 for executing an instruction of control program realizing various functions; (ii) the HDD 55 storing the program; (iii) the RAM 53 for expanding the program; (iv) a storage device (storage medium) such as a memory storing the program and various data; and (v) the like. The object of the present invention also can be achieved by (i) providing, for the control server 2, a storage medium storing, in a computer readable manner, a program code (executable program; intermediate code; source program) of the control program for the present system, and (ii) causing a computer (CPU or MPU) to read and execute the program code stored in the storage medium, the program code being the software realizing the aforementioned functions.

Examples of the storage medium are: (i) tapes such as a magnetic tape and a cassette tape; (ii) magnetic disks such as a Floppy® disk and a hard disk; (iii) optical disks such as a compact disk read only memory (CD-ROM), a magnetic optical disk (MO), a mini disk (MD), a digital video disk (DVD), and a CD-Recordable (CD-R); (iv) cards such as an IC card (inclusive of a memory card) and an optical card; and (v) semiconductor memories such as a mask ROM, an EPROM (electrically programmable read only memory), an EEPROM (electrically erasable programmable read only memory), and a flash ROM.

Further, the control server 2 may be connectable to the communication network, and the program code may be supplied via the communication network. The communication network is not particularly limited. Specific examples thereof are: the Internet, Intranet, Extranet, LAN (local area network), ISDN (integrated services digital network), VAN (value added network), CATV (cable TV) communication network, virtual private network, telephone network, mobile communication network, satellite communication network, and the like. Further, the transmission medium constituting the communication network is not particularly limited. Specific examples thereof are: (i) a wired channel using an IEEE 1394, a USB (universal serial bus), a power-line communication, a cable TV line, a telephone line, an ADSL line, or the like; or (ii) a wireless communication using IrDA, infrared rays used for a remote controller, Bluetooth®, IEEE 802.11, HDR (High Data Rate), a mobile phone network, a satellite connection, a terrestrial digital network, or the like. Note that, the present invention can be realized by (i) a carrier wave realized by electronic transmission of the program code, or (ii) a form of a series of data signals.

(Operation of the Control Server)

Figure 5:
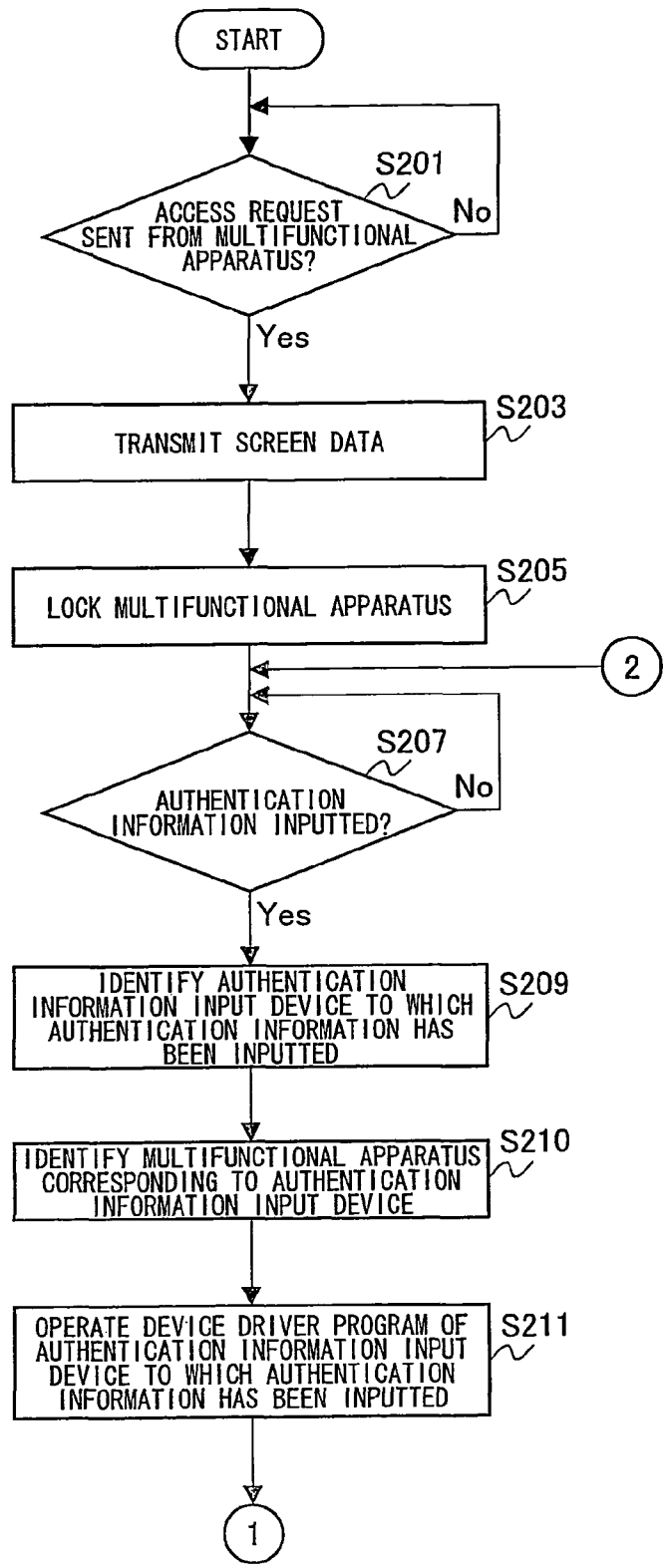
FIG. 5 shows an embodiment of the present invention, and is a flow chart showing the first half of a process by which the control server controls the multifunctional apparatus.
Figure 6:
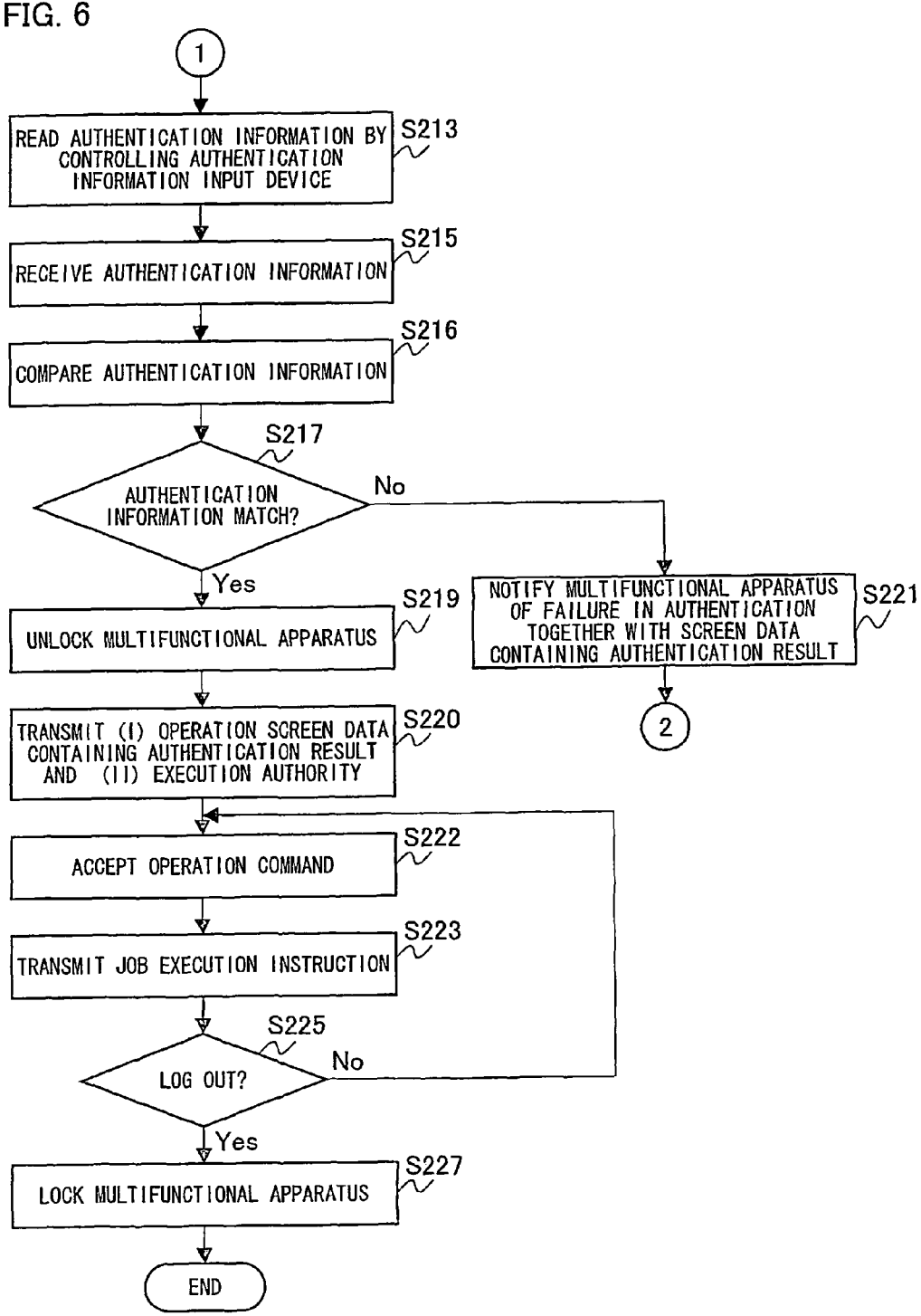
FIG. 6 shows an embodiment of the present invention, and is a flow chart showing the second half of the process by which the control server controls the multifunctional apparatus.

The following describes how the control server 2 performs an operation of controlling a multifunctional apparatus and an authentication information input device. FIGS. 5 and 6 are a flow chart showing processing steps that are taken by the control server 2.

As shown in FIG. 5, first, the multifunctional apparatus control section 79 of the control server 2 judges whether the control server 2 has received an access request from the multifunctional apparatus 1a or 1b (S210). It should be noted that the multifunctional apparatus 1a or 1b transmits an access request to the control server 2 at a point of time where the multifunctional apparatus 1a or 1b is turned on. In cases where the control server 2 receives no access request from the multifunctional apparatus 1a or 1b (No in S201), the process returns to Step S201, where the control server 2 waits until it receives an access request from the multifunctional apparatus 1a or 1b.

On the other hand, in cases where the control server 2 has received an access request from the multifunctional apparatus 1a or 1b, the multifunctional apparatus control section 79 of the control server 2 transmits, to the multifunctional apparatus 1a or 1b from which the control server 2 has received the access request, data of a screen to be displayed on the operation panel 6 (S203). The multifunctional apparatus 1a or 1b, which has received the data, causes the operation panel 6 to display the screen corresponding to the data. FIG. 7 is a diagram showing an example of the screen displayed by the operation panel of the multifunctional apparatus on this occasion. After Step S203, the multifunctional apparatus control section 79 locks the multifunctional apparatus 1a or 1b from which the control server 2 has received the access request (S205). This causes the multifunctional apparatus 1a or 1b to wait while refusing to execute a job.

Next, the I/F converter driver 75 of the control server 2 judges whether the control server 2 has been notified by the I/F converter 8a or 8b of an input event having occurred in the authentication information input device 7a or 7b (S207). The input event occurs in cases where the authentication information input device 7a or 7b becomes capable of reading authentication information. For example, in cases where the authentication information input device 7a is an IC card reader, the I/F converter 8a notifies the I/F converter driver 75 of the occurrence of an input event at a point of time where an IC card inserted into the authentication information input device 7a is ready to be read.

In cases where the control server 2 is not notified of an input event in Step S207, the process returns to Step S207, where the control server 2 waits until the I/F converter driver 75 is notified of an input event. On the other hand, in cases where the control server 2 is notified of an input event in Step S207, the I/F converter driver 75 refers to header information added to the packet data, identifies identification information (i.e., an IP address in this case) for identifying the I/F converter 8a or 8b by which the control server 2 has been notified of the occurrence of the input event, and sends the identified IP address to the device identifying section 72.

The device identifying section 72, which has received the IP address from the I/F converter driver 75, identifies the authentication information input device 7a or 7b in which the input event has occurred (S209). The term "authentication information input device in which the input event has occurred" here refers to an authentication information input device connected to the I/F converters 8a or 8b by which the control server 2 has been notified of the occurrence of the input event. In order to identify the authentication information input device connected to the I/F converter, the device identifying section 72 refers to a first device correspondence table, stored in a storage section (not shown), which correlates the IP address of an I/F converter with identification information for identifying an authentication information input device connected to the I/F converter. Then, the device identifying section 72 acquires, from the first device correspondence table, authentication information input device identification information corresponding to the received IP address, thereby identifying the authentication information input device in which the input event has occurred.

FIG. 8 is a diagram showing an example of the first device correspondence table to which the device identifying section 72 refers in Step S209. In the present embodiment, as shown in FIG. 8, the first device correspondence table shows a correspondence relationship among the IP address of an I/F converter, identification information for identifying an authentication information input device, and identification information for identifying a device driver program. For example, the first device correspondence table shows that the authentication information input device 7a is connected to the I/F converter 8a whose IP address is "192.168.0.10", and that the authentication information input device 7a is controlled with use of an IC card reader driver program. The use of a correspondence relationship between identification information for identifying an authentication information input device and identification information for identifying a device driver program will be described later.

The first device correspondence table is prepared by searching the communication system 500 for an I/F converter with use of a known network search protocol, by correlating (i) identification information (i.e., an IP address in this case) for identifying the I/F converter thus found with (ii) identification information for identifying an authentication information input device connected to the I/F converter, and by retaining the identification information for identifying the I/F converter and the identification information for identifying the authentication information input device.

Next, the device identifying section 72 identifies the multifunctional apparatus 1a or 1b installed beside the authentication information input device 7a or 7b identified in Step S209 (S210). The term "multifunctional apparatus installed beside the authentication information input device" here refers to a multifunctional apparatus that becomes available in cases where a user inputs authentication information to the authentication information input device and succeeds in authentication. In order to identify the multifunctional apparatus installed beside the authentication information input device, the device identifying section 72 refers to a second device correspondence table, stored in a control destination storage section (not shown), which correlates (i) identification information for identifying an authentication information input device with (ii) identification information (i.e., an IP address in this case) for identifying a multifunctional apparatus. Then, the device identifying section 72 acquires, from the second device correspondence table, the IP address of the multifunctional apparatus 1a or 1b whose IP address corresponds to the identification information for identifying the authentication information input device 7a or 7b identified in Step S209, thereby identifying the multifunctional apparatus that the user is permitted to use in cases where he/she succeeds in authentication. The acquired IP address of the multifunctional apparatus is sent to the multifunctional apparatus control section 79.

Figure 9:
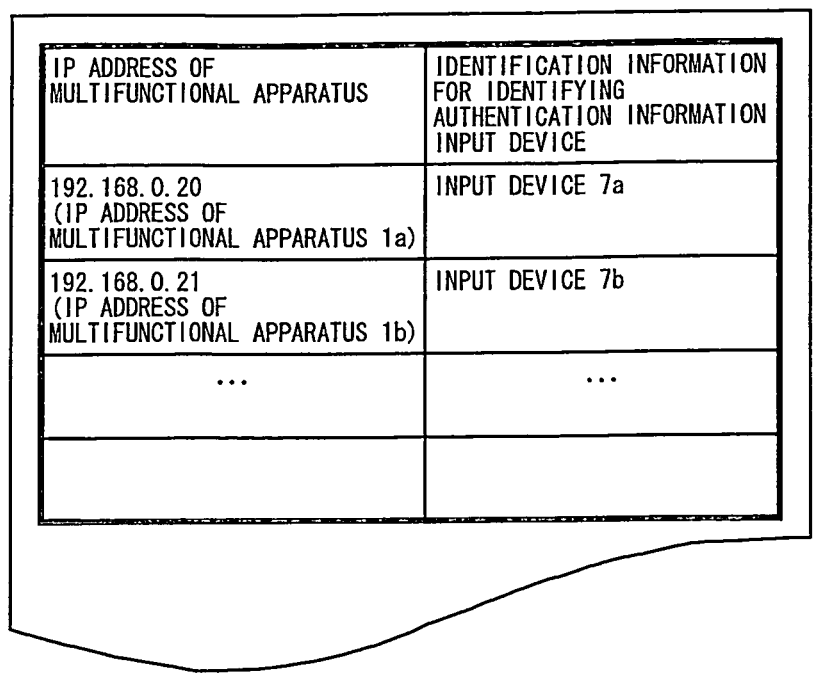
FIG. 9 shows an embodiment of the present invention, and shows an example of a second device correspondence table (control destination storage section, driver correspondence storage section) showing a correspondence relationship between the IP address of an multifunctional apparatus and identification information for identifying an authentication information input device.

FIG. 9 is a diagram showing an example of the second device correspondence table to which the device identifying section 72 refers in Step S210. For example, the second device correspondence table shows that the multifunctional apparatus 1a whose IP address is "192.168.0.20" is installed beside the authentication information input device 7a, and that the use of the multifunctional apparatus 1a is permitted in cases where a user inputs authentication information to the authentication information input device 7a and succeeds in authentication.

Next, the device identifying section 72 invokes, from the driver DB 81, a device driver program for the authentication information input device identified in Step S209, and causes the CPU 51 to execute the device driver program as the authentication information input device driver 77 (S211). In so doing, the device identifying section 72 refers to a driver correspondence table, stored in a driver correspondence storage section (not shown), which correlates (i) identification information for identifying an authentication information input device with (ii) identification information for identifying a device driver program. It should be noted that the first device correspondence table of FIG. 8 serves also as the driver correspondence table. Then, the device identifying section 72 acquires, from the driver correspondence table, device driver program identification information corresponding to identification information for identifying the authentication information input device identified in Step S209. In accordance with the identification information thus acquired, the device identifying section 72 chooses, from the driver DB 81, a device driver program for the authentication information input device in which the input event has occurred, and causes the CPU 51 to execute the device driver program. This enables the authentication information input device driver 77 to control the operation of the authentication information input device 7a or 7b in which the input event has occurred.

Then, the authentication information input device driver 77 controls, over the network, the authentication information input device 7a or 7b in which the input event has occurred, and reads the authentication information (S213). Specifically, the authentication information input device driver 77 reads the authentication information in the following manner.

First, the authentication information input device driver 77 generates USB packet data containing a control command that instructs the authentication information input device 7a or 7b to read authentication information. Then, the USB packet data thus generated is sent to the I/F converter driver 75, and the I/F converter driver 75 converts the USB packet data into packet data (TCP/IP packet data) that is based on the communication protocol of the network 400. The TCP/IP packet data is transmitted through the communication unit 59 to the I/F converter 8a or 8b by which the control server 2 has been notified of the occurrence of the input event in Step S207.

The I/F converter 8a or 8b, which has received the TCP/IP packet data from the control server 200 through the network 400, converts the packet data into USB packet data that is based on the communication protocol of the USB, and then transmits the USB packet data to the authentication information input device 7a or 7b. In accordance with a control command contained in the USB packet data, the authentication information input device 7a or 7b, which has received the USB packet data, reads an ID and password recorded on an IC card, a user's fingerprint, or the like, thereby acquiring authentication information from the user. Then, the authentication information thus acquired is transmitted to the control server 2 via the USB 402, the I/F converter 8a or 8b, and the network 400. Also in this case, as with a case where an instruction command is received, the I/F converter 8a converts the form of USB packet data containing the authentication information, i.e., converts the USB packet data into TCP/IP packet data.

Then, the I/F converter driver 75 of the control sever 2 receives the TCP/IP packet data containing the authentication information transmitted from the authentication information input device 7a or 7b (S215), converts the TCP/IP packet data into USB packet data, and sends the USB packet data to the authentication information input device driver 77. Then, the authentication information input device driver 77 extracts the authentication information from the received USB packet data, and then sends the authentication information to the authenticating section 73.

The authenticating section 73 compares the received authentication information with authentication information registered on the user account database provided in advance in a storage section (not shown) (S216). The user account database shows a correspondence relationship between authentication information and execution authority for each user. In cases where the authentication information input devices acquire different types of authentication information, the respective types of authentication information (information such as a fingerprint and vein of each user) are registered on the user account database.

Figure 10:
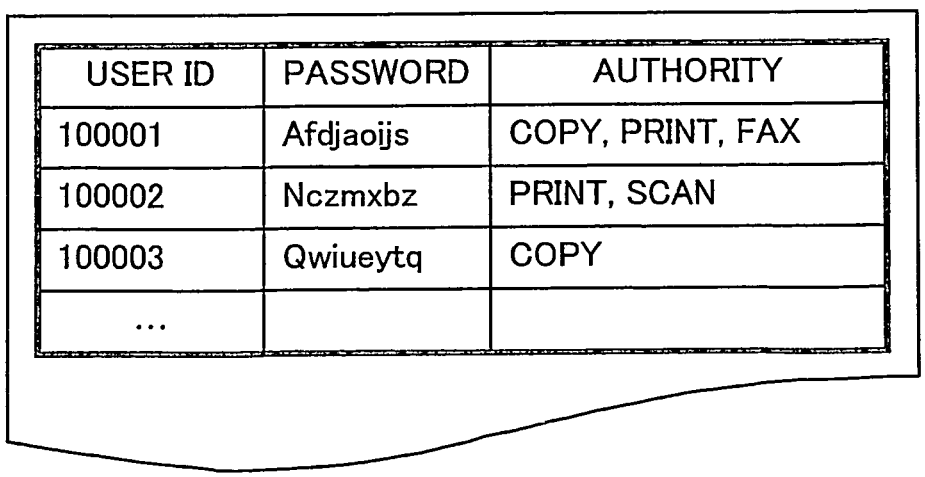
FIG. 10 is a diagram showing an example of a user account database into which authentication information for authenticating a user and the authority of the user have been registered so as to be correlated with each other.

FIG. 10 is a diagram showing an example of the user account database. The user account database is used for reading a user ID and a password as authentication information from an IC card, and shows a correspondence relationship among the authentication information (i.e., the user ID and the password) and the type (execution authority) of job available to the user. Therefore, the user account database defines the execution authority of each user for each job.

For example, the user account database shows that User A whose user ID is "100001" has a password "Afdjaoijs" and is permitted to execute a copy job, a print job, and a facsimile job, and that User C whose user ID is "100003" has a password "Qwiueytq" and is permitted to execute only a copy job.

Figure 11:
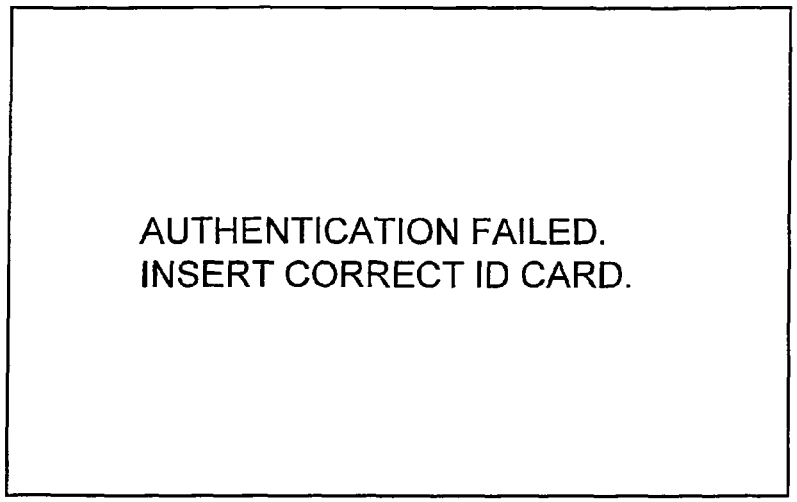
FIG. 11 shows an embodiment of the present invention, and is a diagram showing an example of a screen, indicating an authentication result, which is displayed on the operation panel of the multifunctional apparatus in cases where authentication ends up in failure.

Then, in cases where the authentication information received from the authentication information input device 7a or 7b does not match the authentication information registered on the user account database (No in S217), the authentication ends up in failure. The multifunctional apparatus control section 79 notifies the multifunctional apparatus 1a or 1b that the authentication has ended up in failure, generates data of a screen indicating the result of authentication (failure in authentication), and transmits the data to the multifunctional apparatus 1a or 1b (S221). The destination of the result of authentication and the data in Step S221 is the multifunctional apparatus whose IP address was identified in Step S210. The multifunctional apparatus 1a or 1b, which has received the result of authentication and the data of the screen indicating the result of authentication, causes the operation panel 6 to display the screen corresponding to the received data. FIG. 11 shows an example of the screen indicating the result of authentication in cases where the authentication ends up in failure. Then, the process returns to Step S207, where the control server 2 waits until another input event occurs in the authentication information input device 7a or 7b.

On the other hand, in cases where the authentication information received from the authentication information input device 7a or 7b matches the authentication information registered on the user account database (Yes in S217), the authentication is completed successfully. The multifunctional apparatus control section 79 unlocks the multifunctional apparatus 1a or 1b whose IP address was identified in Step S210 (S219).

Figure 12:
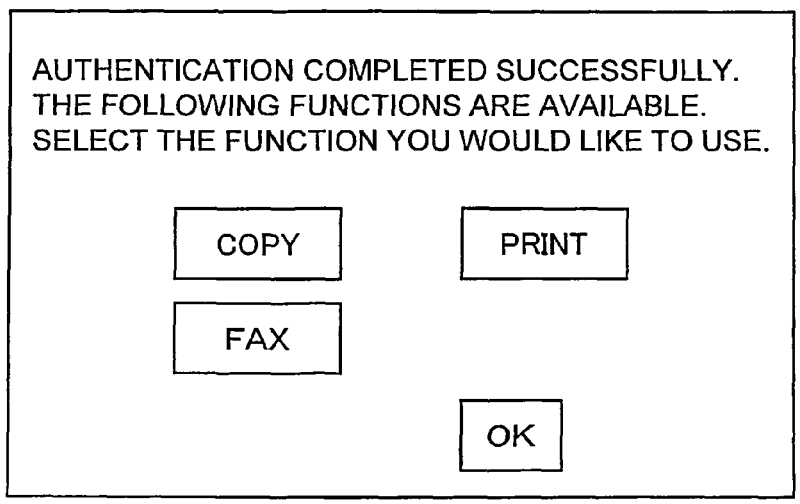
FIG. 12 shows an embodiment of the present invention, and is a diagram showing an example of a screen, indicating an authentication result, which is displayed on the operation panel of the multifunctional apparatus in cases where authentication is completed successfully.

Then, the multifunctional apparatus control section 79 acquires, from the user account database, the execution authority of a user who has succeeded in authentication, and generates, in accordance with the execution authority thus acquired, data of an operation screen indicating a choice of jobs that the user is allowed to execute. The operation screen contains a result of authentication. The result of authentication indicates that the user has succeeded in authentication. The data of the operation screen containing the result of authentication is transmitted to the multifunctional apparatus 1a or 1b by the multifunctional apparatus control section 79 together with the execution authority (S220). The multifunctional apparatus 1a or 1b, which has received the data of the operation screen containing the result of authentication, causes the operation panel 6 to display the operation screen corresponding to the received data. This enables the user to know that he/she has succeeded in authentication and to choose a desired job by operating the operation panel 6. However, since the operation screen only displays a choice of jobs that the user is authorized to execute, the user can only choose a job that he/she is authorized to execute. FIG. 12 shows an example of the operation screen that is displayed on the operation panel 6 in cases where the user has succeeded in authentication.

It should be noted that the multifunctional apparatus 1a or 1b in each step below is the multifunctional apparatus 1a or 1b which interacts with the control server 2 in Step S220 (i.e., whose IP address was identified in Step S210).

After Step S220, when the user chooses the desired job by operating the operation panel 6, the multifunctional apparatus 1a or 1b transmits a control command to the control server 2. When the multifunctional apparatus control section 79 receives the control command from the multifunctional apparatus 1a or 1b (S222), the multifunctional apparatus control section 79 specifies the job of the user's choice in accordance with the received control command, and then transmits a job execution instruction to the multifunctional apparatus 1a or 1b (S223). The multifunctional apparatus 1a or 1b executes the job in accordance with the execution instruction.

Thereafter, the multifunctional apparatus control section 79 of the control server 2 judges whether or not the user has given a log-off instruction (S225). When the user gives a log-off instruction with use of the operation panel 6 of the multifunctional apparatus 1a or 1b that he/she is using, the multifunctional apparatus 1a or 1b sends log-off notification to the multifunctional apparatus control section 79. In cases where the multifunctional apparatus control section 79 receives the log-off notification, the multifunctional apparatus control section 79 judges that the user has given a log-off instruction. In cases where the user gives no log-off instruction, the process returns to Step S222, where the control server 2 waits for the user to choose another job. On the other hand, in cases where the user has given a log-off instruction, the control server terminates the process by locking the multifunctional apparatus 1a or 1b (S227).

(Operation of the Multifunctional Apparatus)

Figure 13:
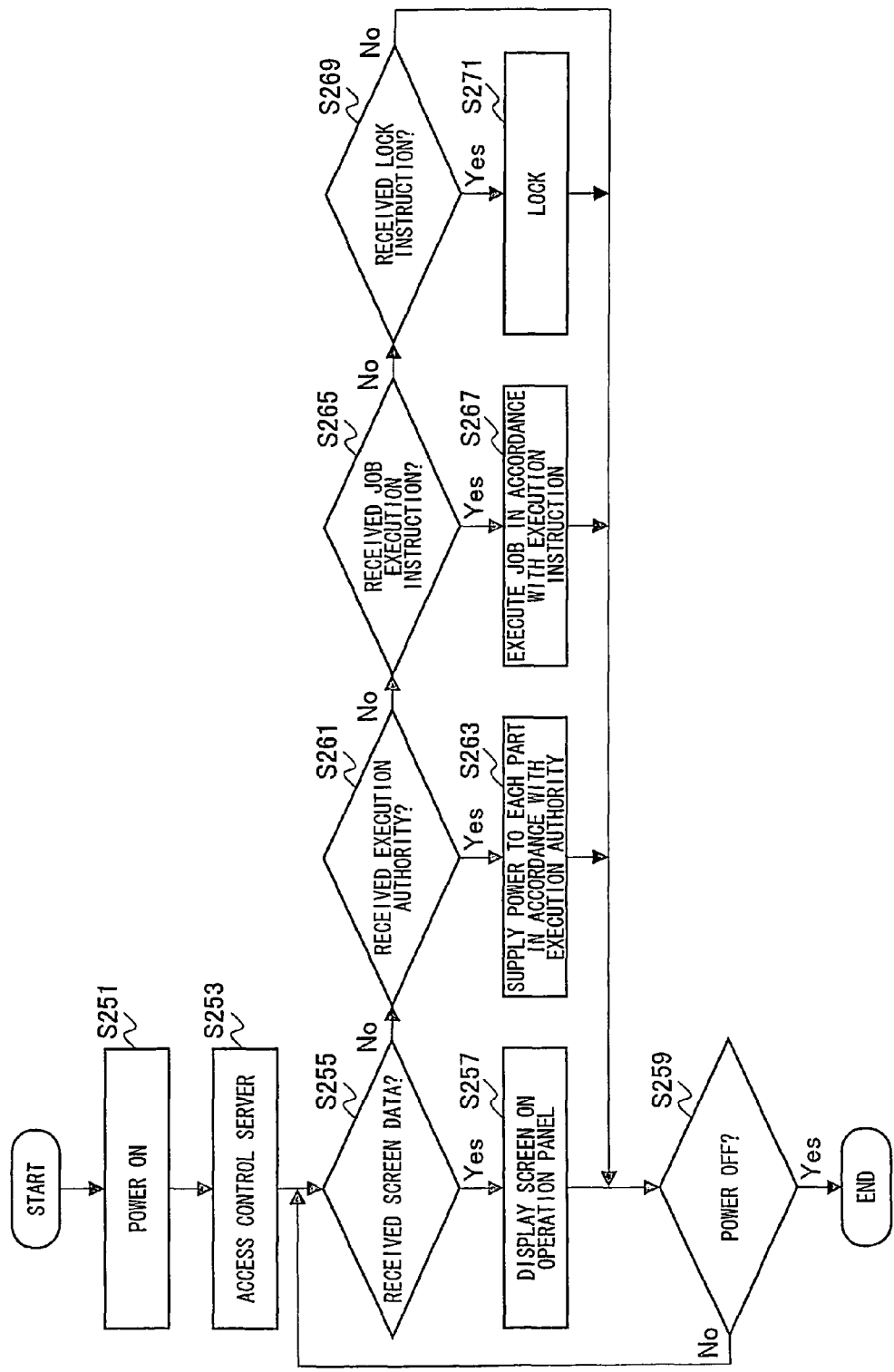
FIG. 13 shows an embodiment of the present invention, and is a flow chart showing the flow of a process that is performed by the multifunctional apparatus.

The following describes the operation of the multifunctional apparatus 1a or 1b. FIG. 13 is a flow chart showing processing steps that are taken by the multifunctional apparatus 1a or 1b. First, when the multifunctional apparatus 1a or 1b is turned on (S251), the multifunctional apparatus 1a or 1b transmits an access request to the control server 2 (S253). The access request of this step corresponds to the access request of Step S201 described above.

Then, the multifunctional apparatus 1a or 1b judges whether or not it has received screen data from the control server 2 (S255). In cases where the multifunctional apparatus 1a or 1b has received screen data (Yes in S255), the multifunctional apparatus 1a or 1b causes the operation panel 6 to display a screen corresponding to the received data (S257). Then, the multifunctional apparatus 1a or 1b judges whether or not a power-off instruction has been given (Step S259). In cases where a power-off instruction has been given, the process is terminated. In cases where no power-off instruction has been given, the process returns to Step S255.

On the other hand, in cases where the multifunctional apparatus 1a or 1b has not received screen data in Step S255, the multifunctional apparatus 1a or 1b judges whether or not it has received execution authority from the control server 2 (S261). The execution authority of this step corresponds to the execution authority of Step S220 described above. Then, in cases where the multifunctional apparatus 1a or 1b receives execution authority (Yes in S261), the multifunctional apparatus 1a or 1b supplies power to each unit thereof. For example, in cases where a user who has succeeded in authentication is authorized to execute only a print job, the multifunctional apparatus 1a or 1b supplies power solely to an image forming engine necessary for a print job. On the other hand, in cases where the user is authorized to execute all jobs, the multifunctional apparatus 1a or 1b supplies power to all units such as an image forming engine, a scanner unit, and a facsimile unit. Then, the process proceeds to Step S259.

On the other hand, in cases where the multifunctional apparatus 1a or 1b has not received execution authority in Step S261, the multifunctional apparatus 1a or 1b judges whether or not it has received a job execution instruction from the control server 2 (S265). The job execution instruction of this step corresponds to the job execution instruction of Step S223 described above. Then, in cases where the multifunctional apparatus 1a or 1b has received an instruction to execute a job (Yes in Step S265), the multifunctional apparatus 1a or 1b executes the job in accordance with the execution instruction (Step S267). Thereafter, the process proceeds to Step S259.

On the other hand, in cases where the multifunctional apparatus 1a or 1b has not received an execution instruction in Step S265, the multifunctional apparatus 1a or 1b judges whether or not it has received a lock instruction from the control server 2 (Step S269). The lock instruction of this step is given from the control server 2 in Steps S205 and S227 described above. Then, in cases where the multifunctional apparatus 1a or 1b has received a lock instruction, the multifunctional apparatus 1a or 1b locks its functions in accordance with the instruction (Step S271). Then, the process proceeds to Step S259.

(Advantages of the Communication System of the Present Embodiment)

As described above, the multifunctional apparatuses 1a and 1b are arranged so as to be operated mostly under the control of the control server 2. This enables a single control server 2 to integrally manage user accounts and logs of the status of use of the multifunctional apparatuses 1a and 1b.

Further, the communication system 500 of the present embodiment is arranged such that the operation of the authentication information input devices 7a and 7b is controlled by the control server 2 instead of the multifunctional apparatuses 1a and 1b. In cases where the multifunctional apparatuses 1a and 1b control the operation of the authentication information input devices 7a and 7b as has been done conventionally, a change in the authentication information input devices 7a and 7b, a change in data format of authentication information recorded on an IC card or the like, or an update of a device driver program requires an arduous task, for example, of replacing ROMs and substrates of the multifunctional apparatuses 1a and 1b in order to change device driver programs. However, according to the arrangement of the present embodiment, the control server 2 is constituted by an ordinary personal computer. This makes it possible to easily introduce and update a device driver program for a new authentication information input devices. This makes it possible to build a flexible authentication system that makes it possible to easily make a change in authentication method and the like.

Further, the communication system 500 of the present embodiment is arranged such that the control server 2 and the authentication information input devices 7a and 7b communicate with each other via the I/F converters 8a and 8b, respectively. Most of the commercially available authentication information input devices are designed to be connected in a non-network way such as USB. Such a non-network mode of connection as USB imposes limitations on the physical distance between a control source and a control destination according to the specifications. However, the present embodiment uses the I/F converters 8a and 8b, connects the authentication information input devices 7a and 7b to the I/F converters 8a and 8b by USB, and connects the I/F converters 8a and 8b to the control server 2 over the network. This makes it possible to lift limits on the distance between the control server 2 and the authentication information input devices 7a and 7b. This enables the control server 2 to remotely control the authentication information input devices 7a and 7b installed beside the multifunctional apparatuses 1a and 1b. This makes it possible to freely build an authentication system by using various types of existing authentication information input device.

Furthermore, in the present embodiment, the control server 2 is constituted by a general-purpose personal computer whose operating system is Windows®. This makes it possible to use an existing device driver program and an existing module in developing a device driver program that is stored in the driver DB 81. This makes it possible to save the trouble of developing a new device driver program.

Further, the present embodiment is arranged such that: the control server 2 has the first device correspondence table which correlates the IP addresses of the I/F converters 8a and 8b with the identification information for identifying the authentication information input devices 7a and 7b; and as described above in Step S209, the device identifying section 72 identifies, in accordance with the IP addresses of the I/F converters 8a and 8b which IP addresses are described in the header information of the received data, which of the authentication information input devices 7a and 7b has transmitted authentication information to the control server 2. With this, even in cases where the communication system 500 includes the plurality of authentication information input devices 7a and 7b, it is possible to specify which of the authentication information input devices has transmitted authentication information.

Furthermore, the present embodiment is arranged such that: the control server 2 has the second device correspondence table which correlates (i) the identification information for identifying the authentication information input devices 7a and 7b with (ii) the IP addresses of the multifunctional apparatuses 1a and 1b; and as described above in Step S210, in cases where authentication has been completed successfully with use of authentication information acquired by the authentication information input devices 7a and 7b, the multifunctional apparatus control section 79 chooses, in accordance with the identification information for identifying the authentication information input devices, a multifunctional apparatus whose operation is to be controlled. With this, even in cases where the communication system 500 includes the plurality of multifunctional apparatuses 1a and 1b, it is possible to specify, in accordance with the authentication information, which multifunctional apparatus to control.

Although the present embodiment is arranged such that the second device correspondence table shows one-to-one correspondence between identification information for identifying a single authentication information input device and an IP address of a single multifunctional apparatus, the present invention is not limited to this. For example, the IP addresses of a plurality of multifunctional apparatuses may be correlated with identification information for identifying a single authentication information input device. This allows a user to use a plurality of multifunctional apparatuses when he/she succeeds in authentication with use of a single authentication information input device.

Further, the present embodiment is arranged such that: the control server 2 has the user account database which correlates authentication information of a user with the type (authority) of job that the user is allowed to use; and the multifunctional apparatus control section 79 permits or prohibits the execution of a job for each multifunctional apparatus. This makes it possible to impose various limitations on each user.

Embodiment 2

Another embodiment of the present invention will be described below with reference to FIGS. 14 through 16. Components identical to those described above in Embodiment 1 are given the same reference numerals, and will not be described below.

Figure 14:
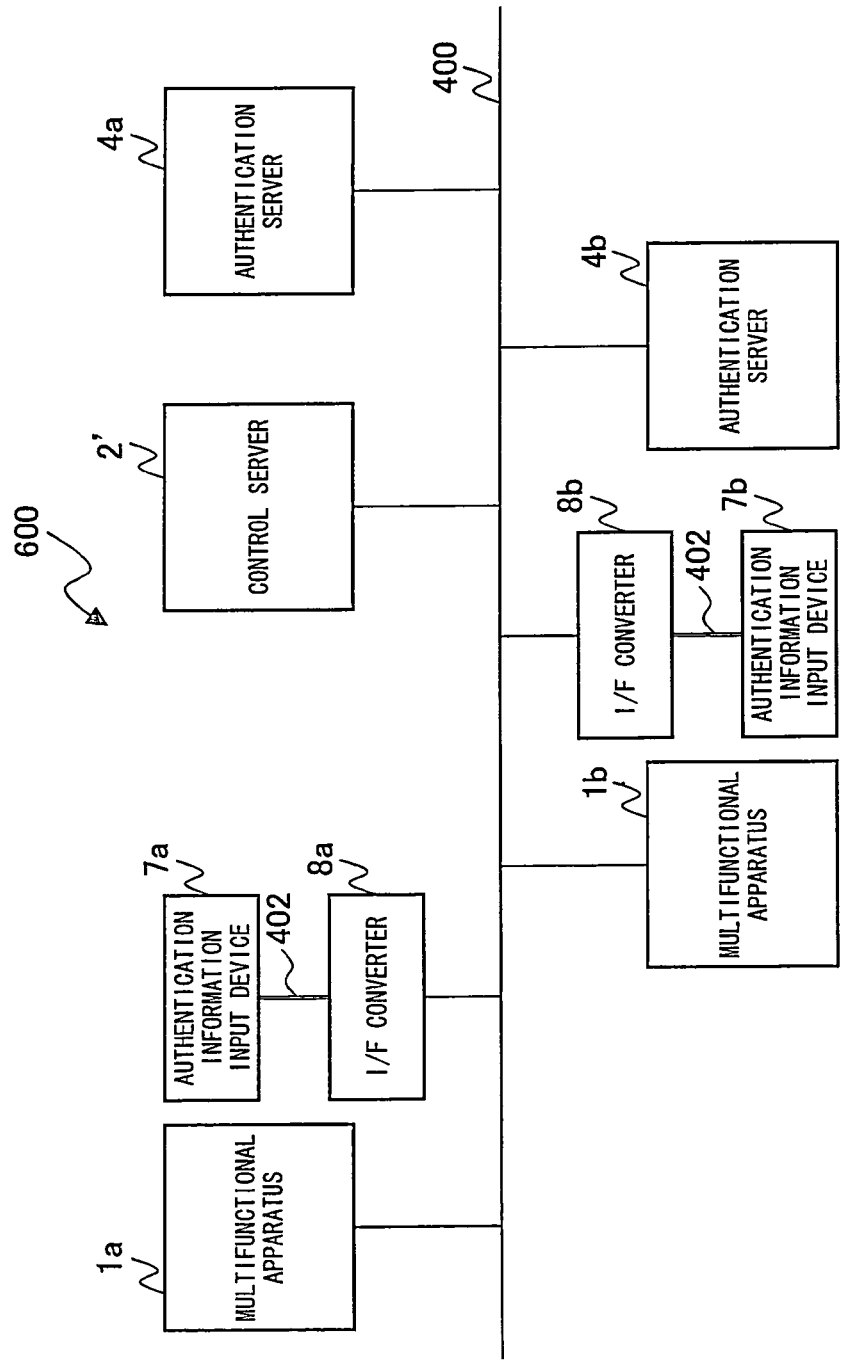
FIG. 14 shows another embodiment of the present invention, and is a block diagram schematically showing an arrangement of a communication system.

FIG. 14 is a block diagram showing an arrangement of a communication system 600 of the present embodiment. The communication system 600 of the present embodiment includes multifunctional apparatuses 1a and 1b, a control server 2', authentication servers 4a and 4b, authentication information input devices 7a and 7b, and I/F converters 8a and 8b.

Whereas Embodiment 1 described above is arranged such that the authenticating section 73 of the control server 2 performs a process of authenticating a user, the present embodiment is arranged such that each of the authentication servers 4a and 4b performs the process. Each of the authentication servers includes the same authenticating section 73 and the same user account database as does the control server 2 of Embodiment 1, and authenticates a user by making a comparison between authentication information acquired from the user and authentication information registered on the user account database.

Figure 15:
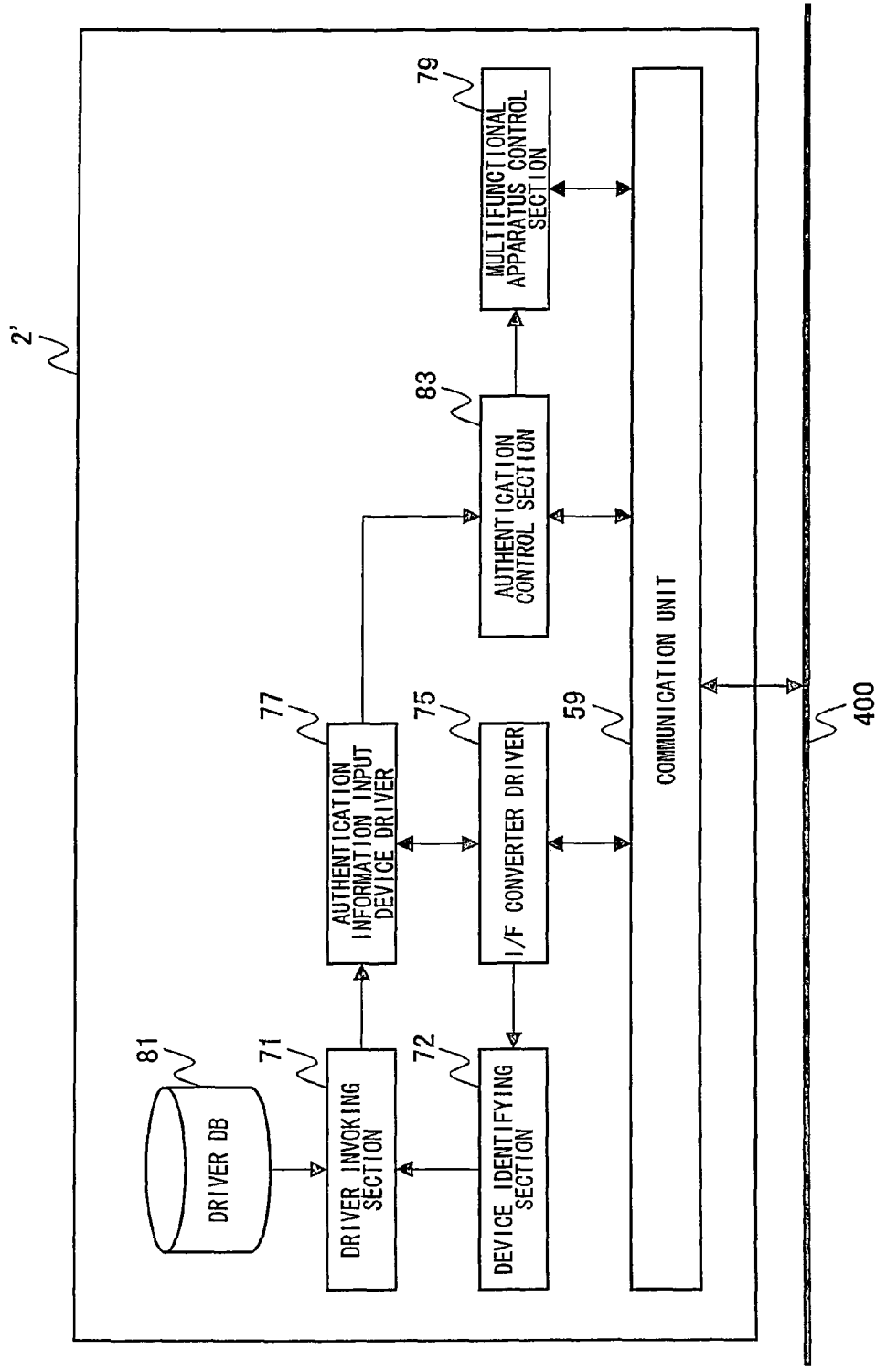
FIG. 15 shows another embodiment of the present invention, and is a block diagram showing a functional arrangement of a control server.

FIG. 15 is a block diagram showing a functional arrangement of the control server 2' of the present embodiment. As shown in FIG. 15, the control server 2' is identical to the control server 2 of Embodiment 1 except that the control server 2' includes an authentication control section (authentication information transmitting means, authentication result receiving means) 83 instead of the authenticating section 73 of Embodiment 1.

The following describes the operation of the control server 2'. In the present embodiment, after Step S215 described above, the authentication information input device driver 77 extracts authentication information from the USB packet data, and then sends the authentication information to the authentication control section 83. Then, the authentication control section 83 transmits the received authentication information to either of the authentication servers 4a and 4b through the communication unit 59 over the network 400.

In so doing, the authentication control section 83 determines the destination of the authentication information in accordance with the type of authentication information input devices 7a and 7b from which the authentication information has been acquired. For example, assume that the authentication information input device 7a is an IC card reader, that the authentication information input device 7b is a fingerprint reader, that the authentication server 4a has a user account database on which a user ID and a password are registered as authentication information, and that the authentication server 4b has a user account database on which fingerprint information is registered as authentication information. In this case, the authentication information (i.e., the user ID and the password) read by the authentication information input device 7a is preferably transmitted to the authentication server 4a that has the user account database on which a user ID and a password are registered as authentication information. Similarly, the authentication information (i.e., the fingerprint information) read by the authentication information input device 7b is preferable transmitted to the authentication server 4b that has the user account database on which fingerprint information is registered as authentication information.

In view of this, the authentication control section 83 refers to a transmission destination correspondence table, stored in a transmission destination storage section (not shown), which correlates (i) identification information for identifying an authentication information input device with (ii) identification information (i.e., an IP address in this case) for identifying an authentication server, and acquires an authentication server IP address corresponding to identification information for identifying the authentication information input device identified in Step S209. Then, the authentication control section 83 transmits, to the authentication server 4a or 4b whose IP address has been acquired, the authentication information received from the authentication information input device driver 77.

FIG. 16 is a diagram showing an example of the transmission destination correspondence table. The transmission destination correspondence table shows that while the authentication information read by the authentication information input device 7a is transmitted to the authentication server 4a whose IP address is "192.168.0.30", the authentication information read by the authentication information input device 7b is transmitted to the authentication server 4b whose IP address is "192.168.0.31".

Then, in the same manner as described above in Step S216 of Embodiment 1, the authentication server 4a or 4b, which has received the authentication information from the authentication control section 83 of the control server 2' through the network 400, compares the received authentication information with the authentication information registered on the user account database. Then, in cases where the received authentication information matches the authentication information registered on the user account database (i.e., in cases where authentication has been completed successfully), the authentication server 4a or 4b transmits, to the authentication control section 83 of the control server 2', notification that authentication has been completed successfully and user's execution authority indicated by the user account database. On the other hand, in cases where the received authentication information does not match the authentication information registered on the user account database (i.e., in cases where authentication has ended up in failure), the authentication server 4a or 4b notifies the authentication control section 83 of the control server 2' that authentication has ended up in failure.

The authentication control section 83, which has been notified by the authentication server 4a or 4b of the success or failure in authentication, proceeds with the process to Step S219 or S221 in accordance with whether the received notification indicates success or failure in authentication. The subsequent steps are identical to those of Embodiment 1.

As described above, the present embodiment is arranged such that each of the authentication servers 4a and 4b performs a process of authentication a user. This makes it possible to prevent the control server 2' from being overloaded by a process of authenticating a user.

Further, the present embodiment is arranged such that: the communication system 600 includes the plurality of authentication servers 4a and 4b; and an authentication server that performs authentication is chosen depending on the type of authentication information input devices 7a and 7b. This makes it possible to disperse load caused by an authentication process.

Embodiment 3

Still another embodiment of the present invention will be described below with reference to FIGS. 17 and 18. Components identical to those described above in Embodiment 1 are given the same reference numerals, and will not be describe below.

Figures 17, 18:
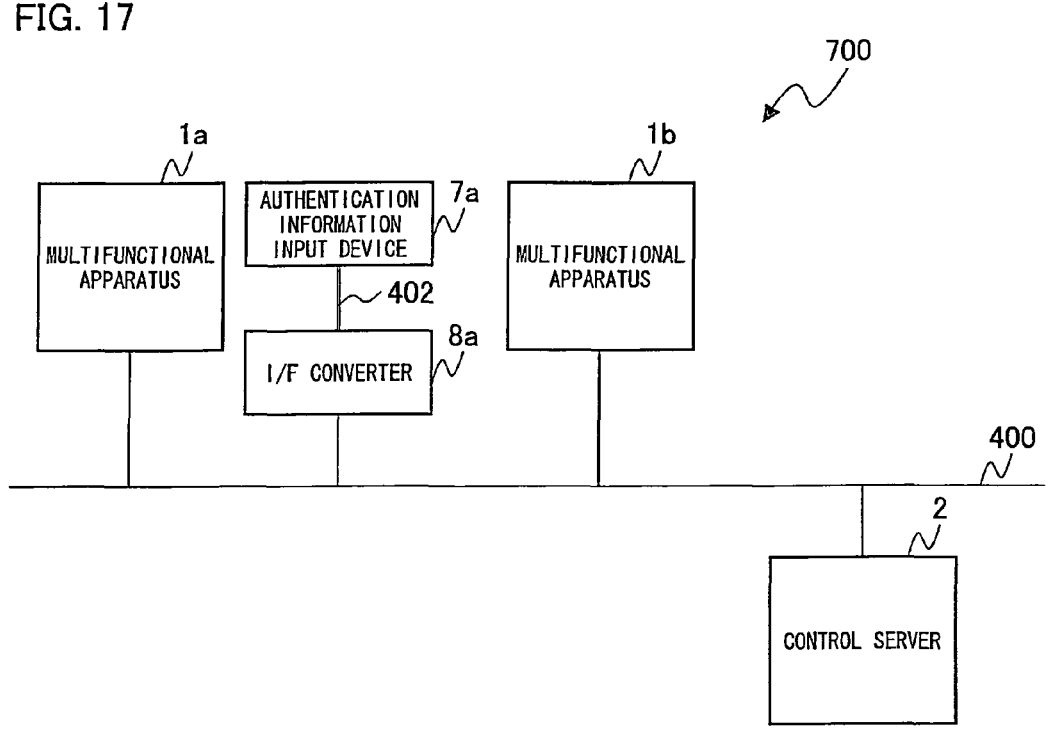
FIG. 17 shows still another embodiment of the present invention, and is a block diagram schematically showing an arrangement of a communication system.
FIG. 18 is a diagram showing another example of a user account database into which authentication information for authenticating a user and the authority of the user have been registered so as to be correlated with each other.

FIG. 17 is a block diagram showing an arrangement of a communication system 700 of the present embodiment. The communication system 700 of the present embodiment includes a single authentication information input device 7a, a single I/F converter 8a, a plurality of (two in this case) of multifunctional apparatuses 1a and 1b, and a control server 2. Authentication information inputted to the authentication information input device 7a is used for permitting the use of both the multifunctional apparatuses 1a and 1b.

Whereas Embodiment 1 described above is arranged so as to decide, in accordance with an authentication information input device used for inputting authentication information, what multifunctional apparatus becomes available, the present embodiment is arranged so as to decide, in accordance with the execution authority of a user, what multifunctional apparatus becomes available. For this reason, identification information (i.e., an IP address in this case) for identifying a multifunctional apparatus available to a user and the type of job are registered on the user account database as authority that is correlated with authentication information for authentication the user.

FIG. 18 is an example of the user account database of the present embodiment. For example, the user account database shows that User A whose user ID is "100001" is permitted to use the multifunctional apparatus 1a whose IP address is "192.168.0.20" and the multifunctional apparatus 1b whose IP address is "192.168.0.21", and that each of the multifunctional apparatuses 1a and 1b is permitted to execute a copy job, a print job, and a facsimile job. Meanwhile, the user account database shows that User C whose user ID is "100003" is permitted to use only the multifunctional apparatus 1a whose IP address is "192.168.0.20", and that the multifunctional apparatus 1a is permitted to execute only a copy job.

Further, each of the multifunctional apparatuses 1a and 1b is provided with a high-intensity LED (not shown) so positioned on the exterior of a housing as to be easily seen from a user.

The following describes the operation of the control server 2. The present embodiment omits Step S210 described above. In cases where the authentication of Step S216 has been completed successfully (Yes in S217), the multifunctional apparatus control section 79 acquires, from the user account database, the authority (IP address and the type of job) of the user who has succeeded in authentication, and enables the user to use a multifunctional apparatus whose IP address corresponds to the acquired IP address. Next, the multifunctional apparatus control section 79 transmits, to the multifunctional apparatus 1a or 1b whose IP address corresponds to the acquired IP address, a control command to instruct the multifunctional apparatus 1a or 1b to unlock itself and a control command to instruct the high-intensity LED to blink.

As a result, the multifunctional apparatus 1a or 1b, which has received the control commands, unlocks itself and causes the high-intensity LED to blink, in accordance with the control commands. The blinking of the high-intensity LED notifies the user that he/she is allowed to use the multifunctional apparatus 1a or 1b provided with the high-intensity LED. Then, the process proceeds to Step S220. The subsequent steps are identical to those of Embodiment 1.

As described above, the present embodiment chooses an available multifunctional apparatus in accordance with authentication information provided from a user. In other words, in cases where a communication system includes a plurality of multifunctional apparatuses, the present embodiment makes it possible to determine, for each multifunctional apparatus, whether the use of the multifunctional apparatus is permitted or prohibited. This makes it possible to limit the types of available multifunctional apparatus in accordance with users.

Further, the present embodiment is arranged such that a single input of authentication information to the single authentication information input device 7a makes it possible to use the plurality (two in this case) of multifunctional apparatuses 1a and 1b. Such an arrangement is preferable because it saves the user the trouble of an authentication process necessary for performing a tandem process with use of both the multifunctional apparatuses 1a and 1b.

Further, the present embodiment is arranged so as to blink a high-intensity LED of a multifunctional apparatus whose use has been permitted. Thus, the multifunctional apparatus whose use has been permitted is caused by the control server 2 to notify the user that the multifunctional apparatus is available. This enables the user to quickly figure out which multifunctional apparatus is available.

Examples of notifying means for notifying the user that the multifunctional apparatus is available are not limited to the high-intensity LED, but may be various devices that give visual notification and various devices that give audio notification.

Supplements to Embodiments 1 to 3

Details of the Control of a Multifunctional Apparatus by a Control Server

In the following, the control of a multifunctional apparatus by the multifunctional apparatus control section 79 will be described more in detail. It should be noted that the following arrangement is common to Embodiments 1 to 3.

As described above, the control server 2 or 2' controls the jobs of the multifunctional apparatuses 1a and 1b via the communication network 400. In controlling the multifunctional apparatus 1a or 1b, the control server 2 or 2' causes the multifunctional apparatus 1a or 1b to execute a process with use of an application installed in the control server 2 or 2'. This enables the multifunctional apparatus 1a or 1b to be controlled by the control server 2 or 2' with use of various processes that cannot be executed solely by using an information processing functions of the multifunctional apparatus 1a or 1b. That is, the multifunctional apparatus 1a or 1b can operate in cooperation with an application installed in the external control server 2 or 2'.

In order to control various features of the multifunctional apparatus 1a or 1b, the applications in the control server 2 or 2' may utilize one or more web services provided by the multifunctional apparatus 1a or 1b. Examples of the control of various features of the multifunctional apparatus 1a or 1b include switching between validation and invalidation of a function of the apparatus, setting a function of the apparatus, and controlling a function of the apparatus. A web service refers to program processing that allows an external apparatus to use a function of an application over a network. A typical web service uses SOAP.

Further, in operating in cooperation with an application installed in the control server 2 or 2', the multifunctional apparatus 1 or 1b (i) accesses the control server 2 or 2', which serves as a web server, (ii) acquires operation screen data corresponding to the application, and (iii) causes the operation panel 6 to display an operation screen. That is, the application installed in the control server 2 or 2' can interact with a user. This enables the multifunctional apparatus 1 or 1b to display an operation screen simply by requesting the control server 2 or 2' for operation screen data. This makes it unnecessary for the multifunctional apparatus 1 or 1b to manage operation screen data.

Further, regardless of the type of multifunctional apparatuses 1a and 1b, the multifunctional apparatuses 1a and 1b disclose common APIs (Application Program Interface) (control instructions). This enables the control servers 2 and 2' to output common control instructions to the multifunctional apparatuses 1a and 1b regardless of the type of multifunctional apparatuses 1a and 1b. This makes it possible to easily develop a program that is embedded in the control server 2 or 2' in controlling the multifunctional apparatus 1a or 1b with use of a new application. The API is a code that defines commands for use in software development and procedures for using the commands.

It should be noted that the multifunctional apparatuses 1a and 1b and the control servers 2 and 2' use HTTP or HTTPS, which uses SSL (Secure Socket Layer), to communicate with each other in requesting operation screen data or in responding to the request. The use of HTTPS makes it possible to improve security. Examples of markup languages include, but are not particularly limited to, HTML (Hypertext Markup Language), XML (Extensible Markup Language), WML (Wireless Markup Language), XHTML (Extensible Hypertext Markup Language), and other languages.

It should be noted that XML is a description language whose document structure makes it possible to transmit and receive data as simply as with HTML. XML has the advantages of: (1) enabling a user to define the meaning of a character string contained in a document; (2) not depending on any particular software; and (3) facilitating programming.

Meanwhile, in communicating a control instruction for the control server 2 or 2' to control the multifunctional apparatus 1a or 1b, an inter-object communication protocol using a markup language such as XML is used. Examples of such a protocol include SOAP (Simple Object Access Protocol). SOAP is a protocol, based on XML, HTTP, and the like, which is used for invoking data and services. SOAP can enable systems to cooperate with one another.

The following describes an arrangement for the control of operation of the multifunctional apparatuses 1a and 1b by the control server 2 or 2'.

Figure 19:
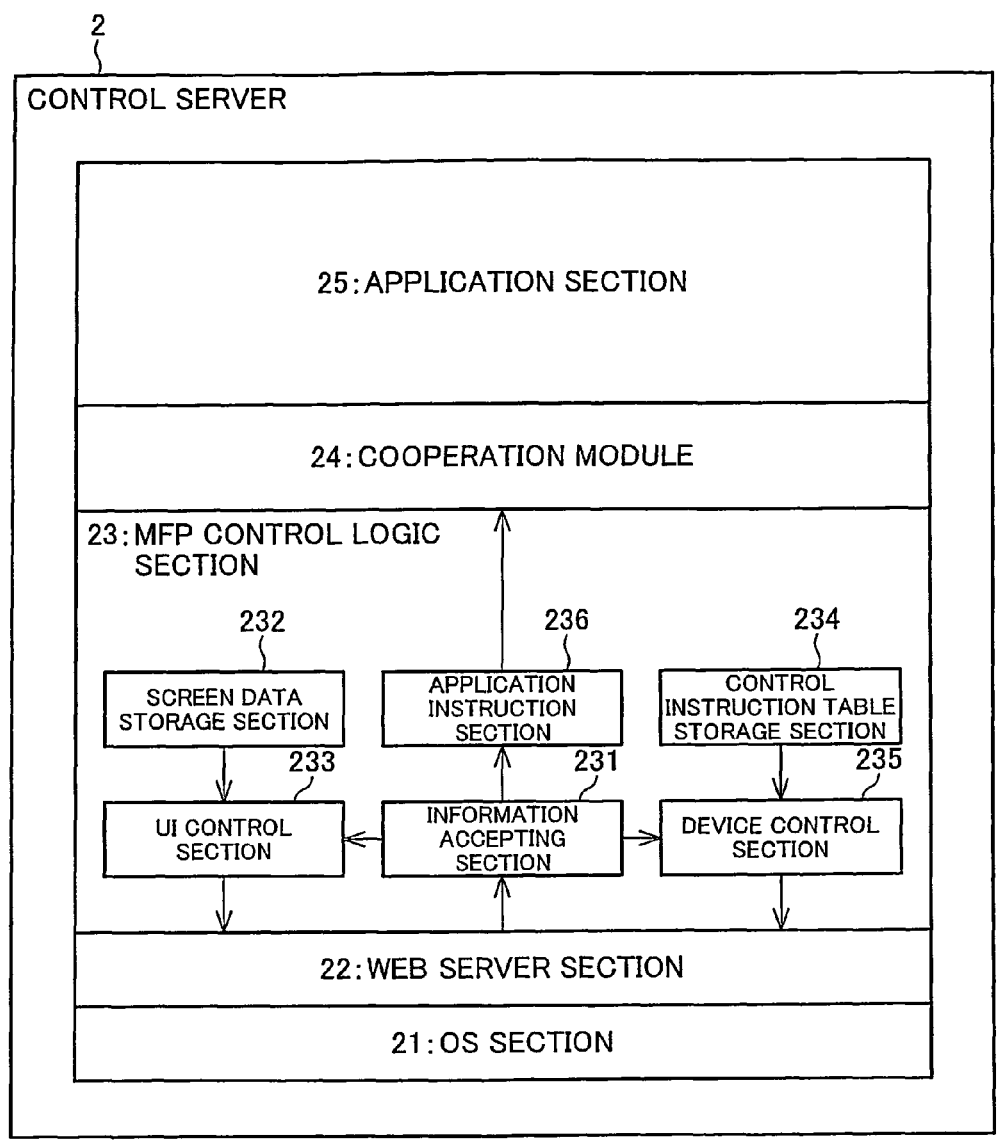
FIG. 19 shows an embodiment of the present invention, and is a block diagram fully showing a functional arrangement of a multifunctional apparatus control section of the control server.

FIG. 19 is a block diagram showing an internal structure of each of the control servers 2 and 2' according to the present embodiment. As shown in FIG. 19, each of the control servers 2 and 2' includes an OS section 21, a Web server section 22, an MFP control logic section 23, a cooperation module 24, and an application section 25 as the multifunctional apparatus control section 79 described above.

The OS section 21 is a block that manages a computer system and thereby executes a process in accordance with an operating system (OS) which provides a basic user operating environment. Examples of the OS include Windows® as described above.

The Web server section 22 performs communication with use of HTTP (Hypertext Transfer Protocol) (or HTTPS) and SOAP (Simple Object Access Protocol). The Web server section 22 receives an HTTP request from the multifunctional apparatus 1a or 1b, and transmits an HTTP response corresponding to the HTTP request. Examples of the Web server section 22 include a block that performs an operation in accordance with software such as Apache.

The MFP control logic section 23 controls an operation screen (UI) of the multifunctional apparatus 1a or 1b and various functions of the apparatus. The MFP control logic section 23 includes an information accepting section 231, a screen data storage section 232, a UI control section 233, a control instruction table storage section 234, a device control section 235, and an application instruction section 236.

The information accepting section 231 accepts information from the multifunctional apparatus 1a or 1b via the Web server section 22, and instructs the UI control section 233, the device control section 235 (execution instruction transmitting means), or the application instruction section 236 to execute a process corresponding to the information.

It should be noted that examples of the information accepted by the information accepting section 231 from the multifunctional apparatus 1a or 1b include transmission request information (request information) for requesting data designated by a URL (Uniform Resource Locator), pressed-button information indicating a button pressed on an operation screen that is based on operation screen data sent from the UI control section 233, and processing request information for the application section 25.

The information accepting section 231 acquires the processing request information from the Web server section 22 with use of SOAP. Further, the information accepting section 231 acquires the transmission request information and the pressed-button information from the Web server section 22 with use of HTTP (or HTTPS).

Examples of the processing request information include information for requesting an authorization application to authorize a user and information for requesting an event tabulation application to perform a tabulation process. Any processing request information other than those examples can be used, provided that the information is optionally (or regularly) supplied from the multifunctional apparatus 1a or 1b and the application section 25 performs a process based on the information.

In cases where the information accepting section 231 accepts transmission request information, the transmission accepting section 231 outputs the transmission request information to the UI control section 233.

Further, the information accepting section 231 manages a pressed button-processing content table that correlates, with pressed button information indicating a button pressed on the operation screen, processing information indicating the content of a process that is performed by any one of the UI control section 233, the application instruction section 236, and the device control section 235 in accordance with the pressing of the button.

In cases where the information accepting section 231 accepts pressed-button information, the information accepting section 231 specifies, from the pressed button-processing content table, processing content information corresponding to the pressed-button information. Then, the information accepting section 231 instructs the UI control section 233, the application instruction section 236, and the device control section 235 to execute a process indicated by the specified processing content information. That is, in cases where the processing content information is information concerning UI control, the information accepting section 231 notifies the UI control section 233 of the content indicated by the information. In cases where the processing content information is information concerning an application, the information accepting section 231 notifies the application instruction section 236 of the content indicated by the information. In cases where the processing content information is information concerning device control, the information accepting section 231 notifies the device control section 235 of the content indicated by the information.

Furthermore, in addition to the pressed button-processing content table, the information accepting section 231 manages a processing request-processing content table that correlates, with processing request information for the application section 25, processing content information indicating the content of a process that is performed by any one of the UI control section 233, the application instruction section 236, and the device control section 235 in accordance with the processing request information.

In cases where the information accepting section 231 accepts processing request information, the information accepting section 231 specifies, from the processing request-processing content table, processing content information corresponding to the processing request information. Then, the information accepting section 231 instructs the UI control section 233, the application instruction section 236, and the device control section 235 to execute a process indicated by the specified processing content information.

The image data storage section 232 stores operation screen data indicating each operation screen that is displayed by the operation panel 6 of the multifunctional apparatus 1a or 1b.

The UI control section 233 read out, from the image data storage section 232, operation screen data corresponding to an instruction given from the information accepting section 231, and outputs the operation screen data to the multifunctional apparatus 1a or 1b via the Web server section 22. It should be noted that the UI control section 233 transmits the operation screen data with use of HTTP (or HTTPS).

In accordance with the content of an instruction given from the information accepting section 231, the application instruction section 236 causes the application section 25 to start a predetermined process.

The control instruction table storage section 234 stores a control instruction table that correlates, with a control content for the multifunctional apparatus 1, a control instruction that is given in cases where control is performed in accordance with the control content. FIG. 20 is a diagram showing an example of the control instruction table. For example, as shown in FIG. 20, the control instruction table storage section 234 stores the control content "scanning" in association with the control instructions "JobCreate", "ExecuteScan", and "JobClose". In case where the control instruction table storage section 234 stores a plurality of control instructions in association with a single piece of control content, the control instruction table storage section 234 also stores the order of output (order of control) of the control instructions is also stored.

It should be noted, as will be mentioned later, that a control instruction stored in the control instruction table storage section 234 is an API disclosed by a Web service layer 17 of each of the multifunctional apparatuses 1a and 1b, and is a common API that does not depend on the type of multifunctional apparatuses 1a and 1b.

The device control section 235 reads out, from the control instruction table storage section 234, a control instruction corresponding to control content received from the information accepting section 231 or the application section 25, and transmits the control instruction to the multifunctional apparatus 1a or 1b via the Web server section 22. It should be noted that the device control section 235 transmits the control instruction to the multifunctional apparatus 1 with use of SOAP.

The application section 25 is a block that performs processes corresponding to various applications. For example, the application section 25 performs operations corresponding to a document management application for saving and managing image data, an OCR (Optical Character Recognition) application, a translation application, an event tabulation application for tabulating events executed by the multifunctional apparatus 1a or 1b, and other applications.

The cooperation module 24 is a module via which the application section 25 and the MFP control logic section 23 are connected to each other. The cooperation module 24 transmits a command from the application instruction section 236 to the application section 25, and transmits a command from the application section 25 to the device control section 235.

Figure 21:
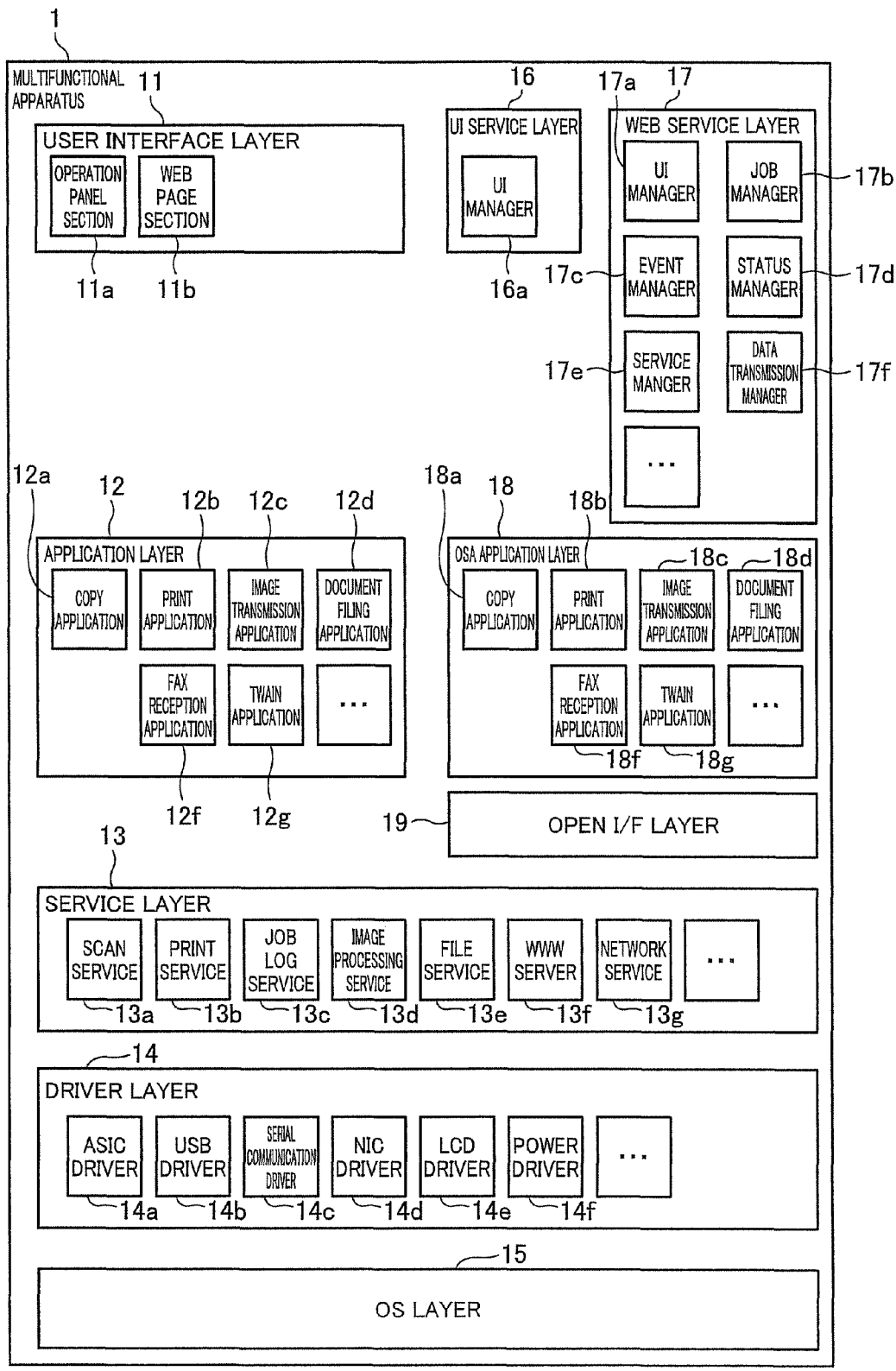
FIG. 21 shows an embodiment of the present invention, and is a block diagram showing a functional arrangement of the multifunctional apparatus.

The following describes an internal structure of each of the multifunctional apparatuses 1 with reference to a block diagram of FIG. 21. As shown in FIG. 21, each of the multifunctional apparatuses 1a and 1b includes a user interface layer 11, an application layer 12, a service layer (elemental job executing means) 13, a driver layer 14, an OS layer 15, a UI service layer 16, a Web service layer (execution instruction accepting means) 17, an OSA application layer (first command output means) 18, and an Open I/F layer (command corresponding information storage section, control command converting means) 19.

The user interface layer 11 is an interface for a user to operate the multifunctional apparatus 1a or 1b. The user interface layer 11 stores an operation screen (unique operation screen) unique to the multifunctional apparatus 1a or 1b, and causes the operation panel 6 to display the unique operation screen. The user can control the multifunctional apparatus 1a or 1b by providing the unique operation screen with an input for executing a desired function.

It should be noted that the user interface layer 11 has an operation panel section 11a that performs a process of transmitting, to the application layer 12, information inputted to the operation screen of the multifunctional apparatus 1a or 1b.

Further, the user interface layer 11 has a Web page section 11b that performs a process of transmitting, to the application layer 12, information inputted to a Web page.

The application layer 12 operates in accordance with an application that controls various apparatus functions (cooperation jobs) of the multifunctional apparatus 1a or 1b.

The term "cooperation jobs" here refers to jobs that are realized by appropriately combining elemental jobs such as a scan job, a print job, an image processing job, and a communication job. Examples of the cooperation jobs that are realized by appropriately combining the elemental jobs include: a copy job, which is executed by combining the scanning job, the image processing job, and the print job; and an image transmitting job, which is executed by combining the scan job and the communication job.

The application layer 12 of the present embodiment includes a copy application 12a for executing/controlling the copy job, a print application 12b for executing/controlling the print job, an image transmitting application 12c for executing/controlling the job (image transmitting job) of transmitting scanned image data to an external apparatus, a document filing application 12d for executing/controlling a document filing job, a user authentication application 12e for executing/controlling a user authentication job, a fax receiving application 12f for executing/controlling a fax receiving job, a TWAIN application 12g for executing/controlling a TWAIN function, and the like.

The service layer 13 is a layer located so as to be subordinate to the application layer 12, and controls various elemental jobs of the multifunctional apparatus 1a or 1b in accordance with instructions given from the application layer 12.

The service layer 13 of the present embodiment includes elemental jobs such as a scan service 13a for controlling a scan operation, a print service 13b, controlling a print operation, which is used at the time of executing/controlling a print job and a copy job, a job log service 13c for controlling information management for each job, an image processing service 13d for controlling image formation such as image creation, a file service 13e for performing an image managing control operation such as document filing, a WWW server service 13f for performing control for remote access via a Web page, and a network service 13g for controlling an operation of communicating with use of a LAN, a telephone line, or the like.

The driver layer 14 is located so as to be subordinate to the service layer 13, and performs an operation in accordance with software for controlling hardware of the multifunctional apparatus 1a or 1b.

The driver layer 14 of the present embodiment includes an ASIC driver 14a that relates to image formation, a USB driver 14b for performing USB communication, a serial communication driver 14c for performing serial communication, a NIC driver 14d for performing LAN communication, an LCD driver 14e for performing display control of the operation panel 6, and a power driver 14f for managing power.

The OS layer 15 is a layer located so as to be subordinate to the driver layer 14, and manages an operating system.

It should be noted that the user interface layer 11, the application layer 12, the service layer 13, the driver layer 14, and the OS layer 15 perform an operation in accordance with software unique to the multifunctional apparatus 1a or 1b and differ from one multifunctional apparatus to another. The provision of these layers enables the multifunctional apparatus 1 to directly accept an instruction from a user without a communication network and to perform an operation in accordance with the instruction.

However, in cases where there is only a layer unique to such a multifunctional apparatus 1a or 1b as described above, a new application or the like needs to be incorporated into the multifunctional apparatus 1a or 1b for the purpose of performing control accompanied by a process using the new application. This takes a lot of trouble. In view of this, as will be described below, the multifunctional apparatus 1a or 1b of the present embodiment includes a layer which, by cooperating with an application of an external control server 2 or 2', enables the multifunctional apparatus 1 to be controlled by the control server 2 or 2'.

The UI service layer 16 acquires operation screen data from the control server 2 or 2' with use of HTTP (or HTTPS), and causes the operation panel 6 to display an operation screen that is based on the acquired operation screen data. It should be noted that the UI service layer 16 may have a function of a general-purpose Web browser.

The provision of the UI service layer 16 and the user interface layer 11 enables the user to use an operation screen of the operation panel 6 for (i) a standard operation mode in which, by operating an operation screen (displayed by the user interface layer 11) unique to the multifunctional apparatus 1, a job corresponding to the operation is executed by the multifunctional apparatus 1a or 1b or (ii) an open system mode of using a network resource (e.g., RCD application) by displaying an operation screen that is based on operation screen data acquired from the control server 2 or 2'.

The UI service layer 16 includes a UI manager 16a that performs display control of a UI (operation screen) provided from the control server 2 or 2'.

The UI service layer 16 stores URL registration information that correlates, with control identification information that identifies control accompanied by processing of the application section 25 of the control server 2 or 2' (e.g., control name indicating the content of the control), a URL (operation screen identification information) of an operation screen for executing the control. That is, the UI service layer 16 includes a URL registration information storage section (operation screen identification information storage section) (not shown) in which the URL registration information is stored. FIG. 8 shows an example of the URL registration information. It should be noted that the UI service layer 16 newly registers or deletes URL registration information in accordance with a user's input to the input section 5 or in accordance with an instruction from the Web service layer 17.

Moreover, the UI manager 16a of the UI service layer 16 causes the operation panel 6 to display a list of control identification information registered in the URL registration information. Furthermore, the UI manager 16a reads out, from the URL registration information, a URL corresponding to control identification information selected by the user, and transmits, to the control server 2 or 2', transmission request information for requesting operation screen data designated by the URL. In transmitting the transmission request information to the control server 2 or 2', the UI manager 16a uses HTTP (or HTTPS). Then, the UI manager 16a causes the operation panel 6 to display an operation screen in accordance with the acquired operation screen data. Thereafter, the UI manager 16a transmits, to the control server 2 or 2', pressed-button information indicating a button pressed on the operation screen. In transmitting the pressed-button information to the control server 2 or 2', the UI manager 16a uses HTTP (or HTTPS). Then, the UI manager 16a acquires new operation screen data as a response to the transmission of the pressed-button information, and causes the operation panel 6 to display an operation screen in accordance with the new operation screen data.

The Web service layer 17 receives a control instruction from the control server 2 or 2' with use of SOAP, and invokes, from the OSA application layer 18, an appropriate module corresponding to the control instruction. Further, the Web service layer 17 creates a SOAP command indicating information received from the OSA application layer 18, and transmits the SOAP command to the control server 2 or 2'. In the Web service layer 17, a control instruction and a module of the OSA application layer 18 which module is appropriate for control indicated by the control instruction are stored so as to be correlated with each other, and the Web service layer 17 invokes an appropriate module in accordance with the memory content.

The Web service layer 17 of the present embodiment includes a UI manager 17a for processing a Web service concerning UI control, a job manager 17b for processing a Web service concerning job control, an event manager 17c for processing a Web service concerning an event transmission request, a status manager 17d for processing a Web service concerning status control of a job or of a device, a service manager 17e for registering information concerning the OSA application layer 18, a data transmission manager 17f for processing a Web service for transmitting and receiving a job, and the like.

The OSA application layer 18 is an application for controlling the cooperation jobs. The OSA application layer 18 creates a first API (first control command) for controlling an elemental job that is used for a cooperation job that is to be controlled, and then sends the first API to the Open I/F layer 19. As will be described later, a first API that is usable (disclosed) in the Open I/F layer 19 does not depend on the type of multifunctional apparatuses 1a and 1b. This makes it unnecessary for the OSA application layer 18 to change a program code for each multifunctional apparatus. The OSA application layer 18 outputs, to the Open I/F layer 19, a first API disclosed in the Open I/F layer 19.

The OSA application layer 18 of the present embodiment includes a copy application 18a for executing/controlling the copy job, a print application 18b for executing/controlling the print job, an image transmitting application 18c for executing/controlling the job (image transmitting job) of transmitting scanned image data to an external apparatus, a document filing application 18d for executing/controlling the document filing job, a user authentication application 18e for executing/controlling the user authentication job, a fax receiving application 18f for executing/controlling the fax receiving job, a TWAIN application 18g for executing/controlling the TWAIN job, and the like.

The Open I/F layer 19 has a function of disclosing, to the OSA application layer 18, an interface for controlling the service layer 13. The Open I/F layer 19 converts, into a second API (second control command) acceptable to the service layer 13, the first API received from the OSA application layer 18.

The Open I/F layer 19 includes an API table storage section (command storage section) (not shown) for storing an API table that correlates, with a first API disclosed to the OSA application layer 18 (i.e., a first control command that can be externally accepted by the Open I/F layer 19), a second API externally disclosed by the service layer 13 (i.e., a second control command acceptable to the service layer 13). The Open I/F layer 19 invokes an API of the service layer 13 in accordance with the API table. FIG. 9 is a diagram showing an example of the API table retained by the Open I/F layer 19.

The Open I/F layer 19 discloses a common API (i.e., an API acceptable to the Open I/F layer 19) to the OSA application layer 18 regardless of the type of multifunctional apparatuses 1a and 1b. This makes it unnecessary for the OSA application layer 18 to change a program code, and makes it possible for the Web service layer 17 to define, regardless of the type of multifunctional apparatuses 1a and 1b, a common method that is disclosed to an external apparatus. That is, each of the control servers 2 and 2' can make a request to the Web service layer 17 with use of a common method regardless of the type of multifunctional apparatuses 1a and 1b.

Figure 22:
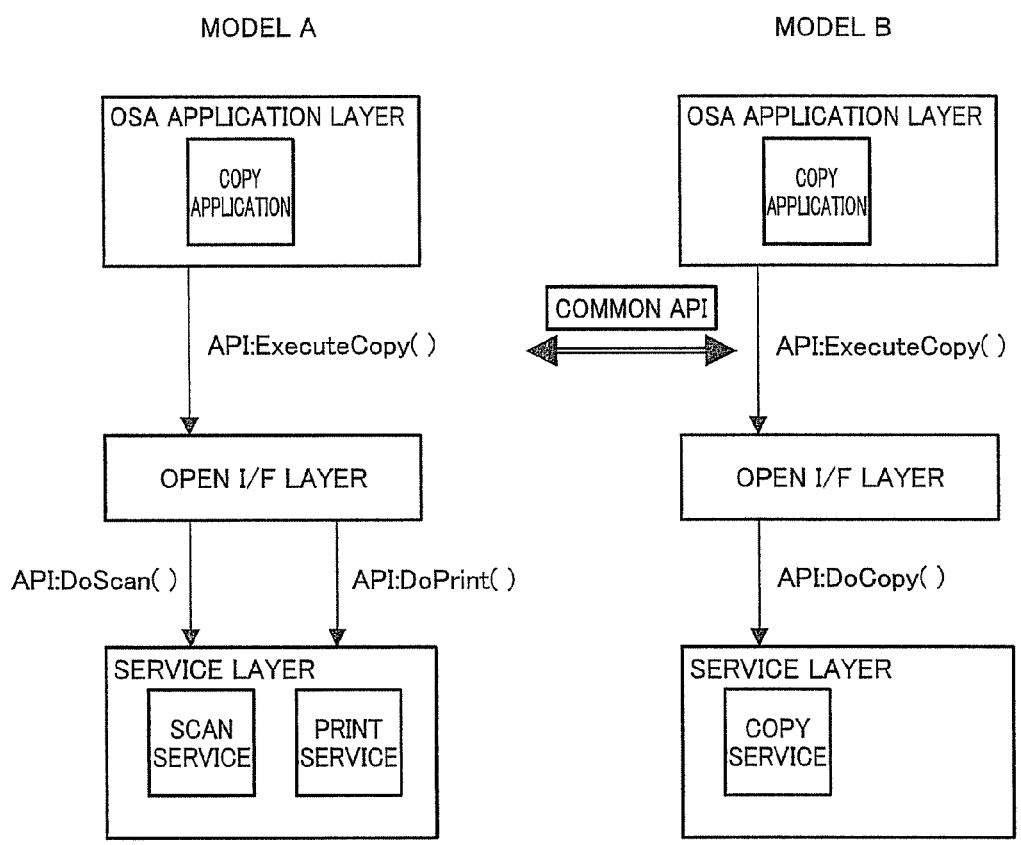
FIG. 22 is a diagram illustrating the functions of an Open I/F layer.

FIG. 22 is a diagram illustrating the function of an Open I/F layer 19. In FIG. 22, Model A of multifunctional apparatus 1a has a service layer 13 that includes a scan service 13a and a print service 13b as elemental functions. In this case, Model A of multifunctional apparatus 1a has an Open I/F layer 19 that stores an API table in which, as shown in FIG. 9, a first API "ExecuteCopy" is correlated with second APIs "DoScan" and "DoPrint". Therefore, even when the Open I/F layer 19 accepts the first API "ExecuteCopy", the Open I/F layer 19 can cause the scan service 13a and the print service 13b to be executed.

Meanwhile, Model B of multifunctional apparatus 1b has a service layer 13 that includes a copy service as an elemental function. In this case, Model B of multifunctional apparatus 1b has an Open I/F layer 19 that stores an API table in which the first API "ExecuteCopy" is correlated with a second API "DoCopy". Therefore, even when the Open I/F layer 19 accepts the first API "ExecuteCopy", the Open I/F layer 19 can cause the copy service to be executed.

Thus, the Open I/F layer 19 has a function of converting an API in accordance with an API table. Therefore, the Open I/F layer 19 can disclose a common first API regardless of the type of multifunctional apparatuses 1a and 1b. This makes it possible to use a common API in a layer superior to the Open I/F layer 19. That is, an external control server 2 or 2' only needs to output a common control instruction to the multifunctional apparatus 1a or 1b regardless of the type of multifunctional apparatuses 1a and 1b.

(Process of Displaying an Operation Screen)

The following describes a process that is performed in the UI manager 16a of the multifunctional apparatus 1 so that an operation screen is displayed.

Operation screen data that is transmitted from the UI control section 233 of the control server 2 or 2' to the UI service layer 16 of the multifunctional apparatus 1 contains (i) screen style information (screen type information) indicating a screen style (screen format) of an operation screen, (ii) part type information indicating the types (e.g., title, square button, radio button, and check box) of parts (screen parts) that constitute the operation screen, and (iii) sub-information indicating texts on the parts.

Meanwhile, the UI manager 16a of the UI service layer 16 includes a screen table storage section (not shown) in which (a) the screen style information and (b) part display information indicating the display style (shape and size) and location of each of the parts (e.g., title, square button, radio button, and check box) that constitute the screen defined by the screen style are stored so as to be correlated with each other. Then, the UI manager 16a converts the received operation screen data into UI data suitable for the operation panel 6 of the multifunctional apparatus 1.

Specifically, the UI manager 16a extracts the screen style information, the part type information, and the sub-information from the operation screen data.

Then, the UI manager 16a reads out, from the screen table storage section (not shown), the part display information corresponding to the screen style information extracted from the operation screen data, and determines the location of each of the parts in accordance with the order of description of the parts in the operation screen data.

Further, the UI manager 16a reads out, from the screen table storage section (not shown), the part display information corresponding to the screen style information extracted from the operation screen data, and determines the display format of each of the parts in accordance with the part type information extracted from the operation screen data. Furthermore, the UI manager 16a determines, in accordance with the sub-information extracted from the operation screen data, texts to be respectively displayed in the parts. Then, the UI manager 16a creates UI data in accordance with the content of the determinations.

Figure 23:
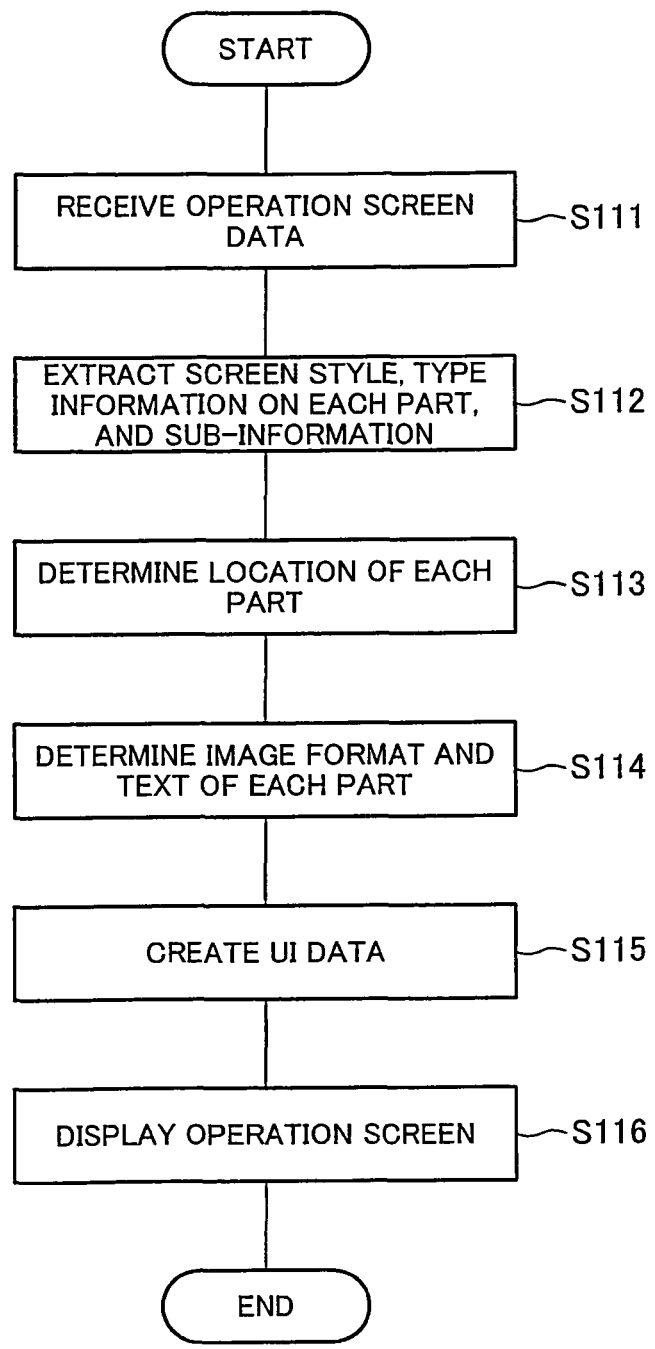
FIG. 23 is a flow chart showing a flow of a process of displaying an operation screen.

A flow of the process of displaying an operation screen will be fully described below with reference to the flow chart of FIG. 23.

First, the UI manager 16a receives operation screen data from a PC (S111). FIG. 24 is a diagram showing an example of the operation screen data transmitted from the PC. In FIG. 24, Section (A) designates the design structure and title of the operation screen. It should be noted that "osa_menu" indicates screen style information, which is defined in each multifunctional apparatus 1. In this case, "osa_menu" corresponds to such a screen style that a control button is located in an upper portion of the screen and a content button is located in a lower portion of the screen.

Section (B) designates the control button that is displayed in the upper portion of the operation screen. Section (C) designates the title displayed on the control screen. Section (D) designates the content button. The "type="submit"" indicates a submit button. The "title" indicates a character string displayed on the button. The "type="checkbox"" indicates a check box. The "selected="true"" indicates a style instruction for causing the corresponding button to be selected by default.

Next, the UI manager 16a extracts the screen style information "osa_menu", part type information, and sub-information from the operation screen data. (S112).

Thereafter, the UI manager 16a reads out, from the screen table storage section (not shown), each piece of part display information corresponding to the screen style information "osa_menu", and then determines the location of each of the parts in accordance with the order of description of the parts in the operation screen data. (S113).

Furthermore, the UI manager 16a determines a display format in accordance with the part display information and the part type information ("submit" and "checkbox") extracted from the operation screen data, and also determines, in accordance with the sub-information, texts to be respectively displayed in the parts (S114).

Then, the UI manager 16a creates UI data in accordance with the content of the determinations (S115). For example, the UI manager 16a creates, from the operation screen data of FIG. 24, such UI data as shown in FIG. 25.

Figure 26:
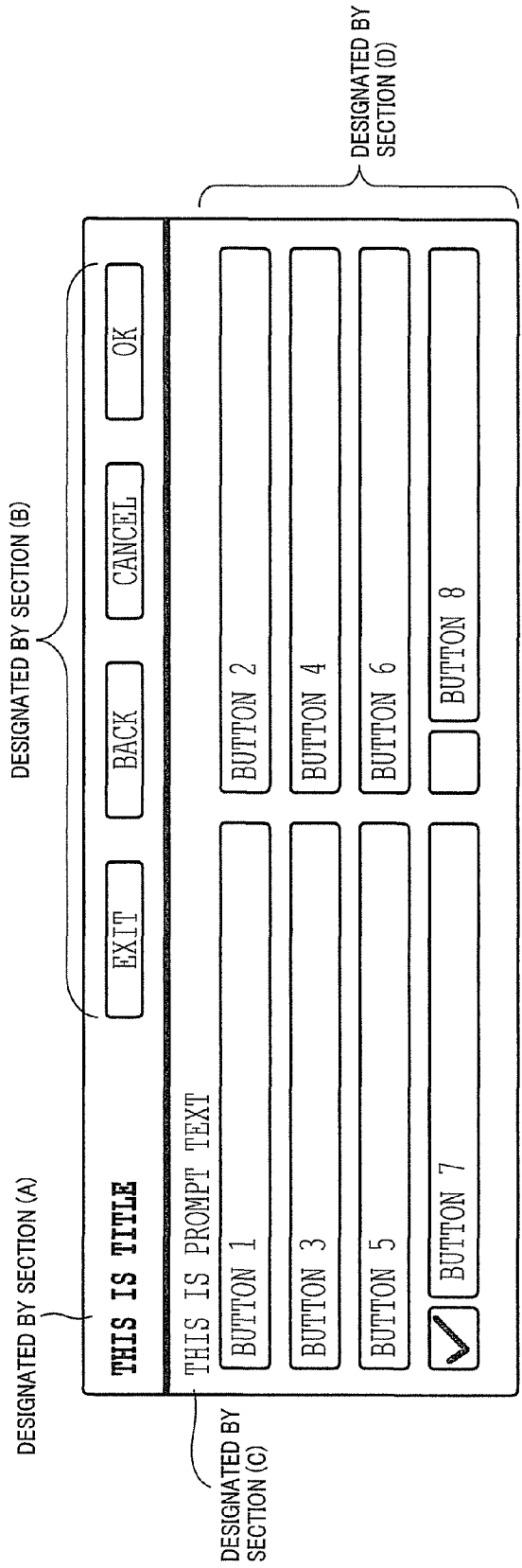
FIG. 26 is a diagram showing an example of an operation screen that is based on FIG. 25.

Thereafter, the UI manager 16a causes the operation panel 6 to display an operation screen in accordance with the created UI data (S116). FIG. 26 is a diagram showing an operation screen that is based on the UI data of FIG. 25.

Advantages and Modified Examples of the Present Embodiment

As described above, each of the multifunctional apparatuses 1a and 1b according to the present embodiment realizes a cooperation job by executing an appropriate combination of a plurality of elemental jobs such as a scan job (image reading job), a print job (image forming job), and a communication job. Moreover, each of the multifunctional apparatuses 1a and 1b includes: a service layer (elemental job executing means) for executing the plurality of elemental jobs; an API table storage section (storage section provided in an Open I/F layer 19; corresponding to a command storage section) for storing an API table that correlates, with a first API (first control command) for executing the cooperation job, a second API (second control command) acceptable to the service layer 13; and an Open I/F layer (control command converting means) 19 for (i) accepting the first API, (ii) specifying, from the API table, a second API corresponding to the first API, and outputting the specified second API to the service layer 13.

As shown in FIG. 22, the service layer 13 is usually arranged so as to be unique to the multifunctional apparatus 1a or 1b. Therefore, the second API acceptable to the service layer 13 varies depending on the type of multifunctional apparatuses 1a and 1b.

However, according to the foregoing arrangement, the Open I/F layer 19 (i) accepts the first API, (ii) specifies, from the API table, a second API corresponding to the first API, and (iii) outputs the specified second API to the service layer 13. With this, even when the second API depends on the type of multifunctional apparatuses 1a and 1b as described above, the first API acceptable to the Open I/F layer 19 can be made independent of the type of multifunctional apparatuses 1a and 1b.

With this, in cases where the multifunctional apparatus 1a or 1b is controlled by an external control server 2 or 2', the control server 2 or 2' only needs to output, to the multifunctional apparatus 1a or 1b, either a first API independent of the type of multifunctional apparatuses 1a and 1b or a control instruction on which the first API is based. As a result, it is only necessary to develop the control server 2 or 2' so that even in cases where the control server 2 or 2' performs new control with respect to the multifunctional apparatus 1, the control server 2 or 2' creates either a common first API regardless of the type of multifunctional apparatuses 1a and 1b or a control instruction on which the first API is based. This makes it easy to improve efficiency in development of the control server 2 or 2'.

Furthermore, each of the multifunctional apparatuses 1a and 1b includes: a Web service layer (execution instruction accepting means) 17 for accepting a control instruction from the control server 2 or 2' via a communication network; and an OSA application layer (cooperation job control means) 18 for creating, in accordance with the control instruction accepted by the Web service layer 17, a first API for executing the cooperation job, and for sending the created first API to the Open I/F layer 19.

As described above, the first API can be made common regardless of the type of multifunctional apparatuses 1a and 1b. Therefore, the OSA application layer 18 can also be arranged so as to be common regardless of the type of multifunctional apparatuses 1a and 1b. This improves efficiency in development of the multifunctional apparatuses 1a and 1b.

Further, in cases where an operation screen is used for controlling the OSA application layer 18, such operation screens are made identical or similar regardless of the type of multifunctional apparatuses 1a and 1b. This is because the OSA application layer 18 does not depend on the type of multifunctional apparatuses 1a and 1b. As a result, users of different types of multifunctional apparatus operate identical operation screens. This improves user-friendliness.

Moreover, since the OSA application layer 18 does not depend on the type of multifunctional apparatuses 1a and 1b, the control instruction acceptable to the OSA application layer 18 also does not depend on the type of multifunctional apparatuses 1a and 1b. Therefore, the control server 2 or 2' only needs to output, to the multifunctional apparatus 1a or 1b, a control instruction that does not depend on the type of multifunctional apparatuses 1a and 1b. As a result, it is only necessary to develop the control server 2 or 2' so that even in cases where the control server 2 or 2' performs new control with respect to the multifunctional apparatus 1a or 1b, the control server 2 or 2' creates either a common first control command regardless of the type of multifunctional apparatuses 1a and 1b or a control instruction on which the first control command is based. This makes it easy to improve efficiency in development of the control server 2 or 2'.

Furthermore, in cases where a plurality of second APIs are stored in the API table so as to be correlated with a single first API, an order in which the plurality of second APIS are outputted is stored in the API table. The Open I/F layer 19 sequentially outputs the plurality of second APIs in accordance with the order.

In case of a cooperation job executed by combining a plurality of elemental jobs, the cooperation job cannot be properly realized without determining an appropriate order in which the elemental jobs are executed. However, according to the foregoing arrangement, the cooperation job can be properly realized since the plurality of second APIs are outputted in accordance with the order stored in the API table.

Furthermore, the control server 2 or 2' creates a control instruction that contains at least one of job creation, execution parameter setting, job execution, job stoppage, job cancellation, and job completion with respect to at least one of copying, scanning, printing, and image transmission. This enables the external control server 2 or 2' to control the multifunctional apparatus 1a or 1b so that the multifunctional apparatus 1a or 1b, e.g., executes, stops, and completes a job such as copying.

Furthermore, the control server 2 or 2' creates a control instruction that contains a transmission request for event information indicating a result of an event item selected from among a plurality of event items including (i) job execution of at least one of copying, scanning, printing, and image transmission, (ii) button operation at least one of copying, scanning, printing, and image transmission, (iii) login at least one of copying, scanning, printing, and image transmission, and (iv) logout at least one of copying, scanning, printing, and image transmission. Moreover, each of the multifunctional apparatuses 1a and 1b includes: an event management table storage section (not shown) (registration information management section) storing an event management table in which event items (as well as event contents) and destinations each contained in the transmission request are correlated with one another; and judging means (provided in the Open I/F layer 19) (not shown) for judging whether or not an elemental job corresponding to an event item (as well as an event content) of the event management table has been executed by a service. In cases where it has been judged by the judging means that an elemental job corresponding to an event item of the event management table has been executed, the OSA application layer 18 specifies, from the event management table, a destination corresponding to the event item. Then, the OSA application layer 18 creates, as the first API, an event information transmission command by which the event information indicating a result of the event item is transmitted to the specified destination.

The foregoing arrangement enables the external control server 2 or 2' to tabulate results of events having occurred in the multifunctional apparatus 1. In so doing, the control server 2 or 2' requests the multifunctional apparatus 1 to transmit only an event item necessary for tabulation. When an elemental function corresponding to the event item has been executed, the control server 2 or 2' can receive event information indicating a result of the event item. With this, the control server 2 or 2' can acquire only event information on a necessary event item simply by a transmission request as soon as the event item has occurred. As a result, the control server 2 or 2' can tabulate current event information accurately.

Furthermore, the cooperation job includes a job of controlling whether the elemental job is valid or invalid, and the Web service layer 17 accepts, as the control instruction, a validation/invalidation switching instruction to switch between validation and invalidation of each elemental job. This enables the control server 2 or 2' to perform such control as to switch between validation and invalidation of an elemental job of the multifunctional apparatus 1a or 1b.

Furthermore, each of the multifunctional apparatuses 1a and 1b includes: an operation panel (display section) 6; and a UI service layer (UI processing means) 16 for causing the operation panel 6 to display an operation screen for the control server 2 or 2' to create the control instruction. The UI service layer 16 (i) transmits, to the control server 2 or 2', transmission request information (request information) for requesting operation screen data of the operation screen, (ii) acquires the operation screen data from the control server 2 or 2' as a response to the transmission request information, and (iii) causes the operation panel 6 to display the operation screen that is based on the acquired operation screen data. Furthermore, the UI service layer 16 transmits, to the control server 2 or 2', information inputted to the operation screen.

Meanwhile, each of the control servers 2 and 2' includes: an information accepting section (request information accepting means) 231 for accepting the transmission request information from the multifunctional apparatus 1; a UI control section (screen data transmitting means) 233 for transmitting, to the multifunctional apparatus 1a or 1b, the operation screen data corresponding to the transmission request information accepted by the information accepting section 231; and a device control section (control instruction transmitting means) 235 (i) for creating, in accordance with pressed-button information (operation input information) inputted to the operation screen corresponding to the operation screen data transmitted by the UI control section 233, a control instruction for controlling the multifunctional apparatus 1a or 1b, and (ii) for transmitting the control instruction to the multifunctional apparatus 1a or 1b.

With this, the multifunctional apparatus 1a or 1b does not need to manage operation screen data of an operation screen, and only needs to request operation screen data of an operation from the control serve 2 or 2' as needed. As a result, new control of the multifunctional apparatus 1a or 1b by the control server 2 or 2' can be developed without the need to incorporate operation screen data of an operation screen into the multifunctional apparatus 1a or 1b. This further improves efficiency in development.

Then, the UI service layer 16 transmits, to the control server 2 or 2', information inputted to the operation screen. This enables the device control section 235 of the control server 2 or 2' to create a control instruction in accordance with the information inputted to the operation screen.

Further, when the UI service layer 16 transmits and receives the transmission request information and the operation screen data by a first communication method (first communication protocol) different from a second communication method (second communication protocol) by which the Web service layer 17 accepts the control instruction. That is, the information accepting section 231 and the UI control section 233 receive and transmit the transmission request information and the operation screen data, respectively, by a first method different from a second communication method by which the device control section 235 transmits the control instruction.

For example, the first communication method is HTTP or HTTPS, and the second communication method is SOAP.

The foregoing arrangement makes it possible to adopt, as the first communication method, a communication method (e.g., HTTP) suitable for transmitting and receiving transmission request information for requesting operation screen data and the operation screen data, and to adopt, as the second communication method, a communication method (e.g., SOAP) suitable for transmitting and receiving the control request.

HTTP has been typically used for communications between a client device and a service device, for the purpose of browsing through Web pages and the like. Using HTTP also for transmission of operation screen data of an operation screen makes it possible to easily construct the UI processing means, for example, by a general-purpose Web browser.

Further, HTTP has limitations in the processing contents of commands such as "get" and "put". For this reason, as to the control instruction, the use of a communication method (communication protocol) such as SOAP makes it possible to perform various processes.

The operation screen is a login data input screen for inputting user information, used for user authentication, which identifies a user. The UI service layer 16 transmits, to the control server 2 or 2', the user information inputted to the login data input screen. As the control instruction, the Web service layer 17 receives a validation/invalidation switching instruction, corresponding to the user information transmitted from the UI service layer 16, which switches between validation and invalidation of each elemental job, and the OSA application layer 18 creates, in response to the validation/invalidation switching instruction, a first API for switching between the validation and invalidation of each elemental job.

In order to enable the multifunctional apparatus 1a or 1b to perform a user authorization process, it has conventionally been necessary to incorporate, into the multifunctional apparatus 1a or 1b, registration information, program, and the like, all of which are used for the user authentication process. In this case, since the multifunctional apparatus 1a or 1b has other various arrangements, the arrangement for use in the user authentication process is limited (e.g., in terms of database capacity). This raises the possibility of a limitation to the number of registrations.

According to the foregoing arrangement, simply by requesting, acquiring, and displaying an input screen and transmitting the input user information, the multifunctional apparatus 1a or 1b can receive an instruction to switch between the validation and invalidation of an elemental job corresponding to a user indicated by the user information. That is, the user authentication process is executed not in the multifunctional apparatus 1a or 1b but in the control server 2 or 2'. This makes it unnecessary to incorporate, into the multifunctional apparatus 1a or 1b, the arrangement for use in the user authorization process. The control server 2 or 2' is provided outside the multifunctional apparatuses 1a and 1b, and is not limited in terms of the arrangement for use in the user authorization process as with the multifunctional apparatuses 1a and 1b. This eliminates conventional problems such as limitation to the number of registrations.

Furthermore, each of the multifunctional apparatuses 1a and 1b includes a URL registration information storage section (operation screen identification information storage section) (not shown) in which, with respect to each of a plurality of such control instructions, URLs (operation screen identification information) for identifying an operation screen for creating the control instructions is stored. The UI service layer 16 selects a single URL from the URL registration information storage section, and transmits transmission request information for requesting operation screen data of an operation screen indicated by the selected URL.

This makes it unnecessary for the user to input a URL every time he/she causes an operation screen to be displayed.

Further, the operation screen data contains (i) screen style information (screen type information) indicating a screen format (screen style) of the operation screen and (ii) part type information indicating types of parts that constitute the operation screen. Moreover, the UI service layer 16 includes a screen table storage section (not shown) in which the screen style information and part display information indicating the locations and display formats of the image parts in the operation screen, displayed by the operation panel 6, whose screen format is indicated by the screen style information, are stored so as to be correlated with each other. The UI service layer 16 reads out, from the screen table storage section, part display information corresponding to the screen type information contained in the operation screen data acquired from the control server 2 or 2', creates an operation screen in accordance with the part display information and the part type information contained in the operation screen data acquired from the control server 2 or 2', and causes the operation panel 6 to display the operation screen.

This allows each of the control servers 2 and 2' to create, independently of the type of multifunctional apparatuses 1a and 1b, operation screen data containing the screen type information and the part type information. This results in improved efficiency in development of the operation screen data.

Furthermore, each of the multifunctional apparatuses 1a and 1b may include a UI manager (registration/editing means) 17a which, in response to a request sent from an external apparatus, stores new URL registration information in the URL registration information storage section and/or edits the URL registration information stored in the URL registration information storage section. This enables an external apparatus to register, edit, and/or delete URL registration information.

Furthermore, each of the multifunctional apparatuses 1a and 1b may include a status manager (informing means) 17d which, in response to a request sent from an external apparatus, informs the external apparatus of the URL registration information stored in the URL registration information storage section.

The foregoing arrangement makes it possible to receive, from a multifunctional apparatus 1a or 1b that has already been used, URL registration information registered in the multifunctional apparatus 1a or 1b. This enables a user who has purchased a new multifunctional apparatus 1a or 1b to acquire URL registration information from another multifunctional apparatus 1a or 1b that has already been used, and to store the URL registration information in the newly-purchased multifunctional apparatus 1a or 1b. As a result, the user can easily register the URL registration information in the newly-purchased multifunctional apparatus 1a or 1b.

Modified Example 1

In each of Embodiments 1 to 3 described above, each of the control servers 2 and 2' is basically arranged so as to be solely responsible for controlling the operation of each of the multifunctional apparatuses 1a and 1b and managing data of an operation screen that the multifunctional apparatus 1a or 1b causes the operation screen 6 to display. However, the present invention is not limited to this. That is, each of the control servers 2 and 2' may be arranged so as to only lock and unlock the multifunctional apparatuses 1a and 1b. In this case, when the multifunctional apparatus 1a or 1b, a user who has succeeded in authentication becomes able to cause the multifunctional apparatus 1a or 1b to freely execute a job the within the scope of his/her execution authority. This modified example will be described below.

In this modified example, each of the multifunctional apparatuses 1a and 1b accepts and executes various jobs by using the user interface layer 11 and the application layer 12 instead of the UI service layer 16, the Web service layer 17, the OSA application layer 18, and the Open I/F layer 19.

Each of the control servers 2 and 2' operates in the same manner as it does between Step S201 of FIG. 5 and Step S217 of FIG. 6. After the multifunctional apparatus control section 79 of the control sever 2 or 2' has unlocked a multifunctional apparatus in Step S219, the multifunctional apparatus control section 79 transmits only an authentication result and execution authority. Meanwhile, the multifunctional apparatus 1a or 1b, which has been unlocked and which has received the authentication result and the execution authority, accepts various job execution instructions from the user within the scope of the execution authority thus received. Then, the multifunctional apparatus 1a or 1b, which has accepted a job execution instruction, executes a job autonomously without being controlled by the control server 2 or 2'.

Further, data of an operation screen that is displayed on the operation panel 6 in accepting an job execution instruction is not acquired as needed from the control server 2 or 2', but is selected for use from among those pieces of data stored in a storage section (not shown) by the multifunctional apparatus 1a or 1b.

Then, when the user logs out of the multifunctional apparatus 1a or 1b, the multifunctional apparatus 1a or 1b asks the control server 2 or 2' to lock the multifunctional apparatus 1a or 1b, and the control server 2 or 2' locks the multifunctional apparatus 1a or 1b. As a result, the multifunctional apparatus 1a or 1b stops accepting a job execution instruction from the user. This prevents the user from causing the multifunctional apparatus 1a or 1b to execute a job.

Examples of cases where the user logs out of the multifunctional apparatus 1a or 1b include a case where the user explicitly gives a log-out instruction with use of the operation panel 6 of the multifunctional apparatus 1a or 1b and a case where a predetermined period of time has elapsed since the completion of a job.

Even the arrangement of such a modified example can solve the conventional problems described above.

Modified Example 2

In each of Embodiments 1 to 3 described above, each of the control servers 2 and 2' is arranged to control the operation of both the authentication information input devices 7a and 7b and the multifunctional apparatuses 1a and 1b. However, the present invention is not limited to this. That is, each of the control servers 2 and 2' may be arranged to control only the operation of the authentication information input devices 7a and 7b, and the operation of the multifunctional apparatuses 1a and 1b may be controlled by another server, e.g., by the authentication servers 4a and 4b of Embodiment 2.

Figure 27:
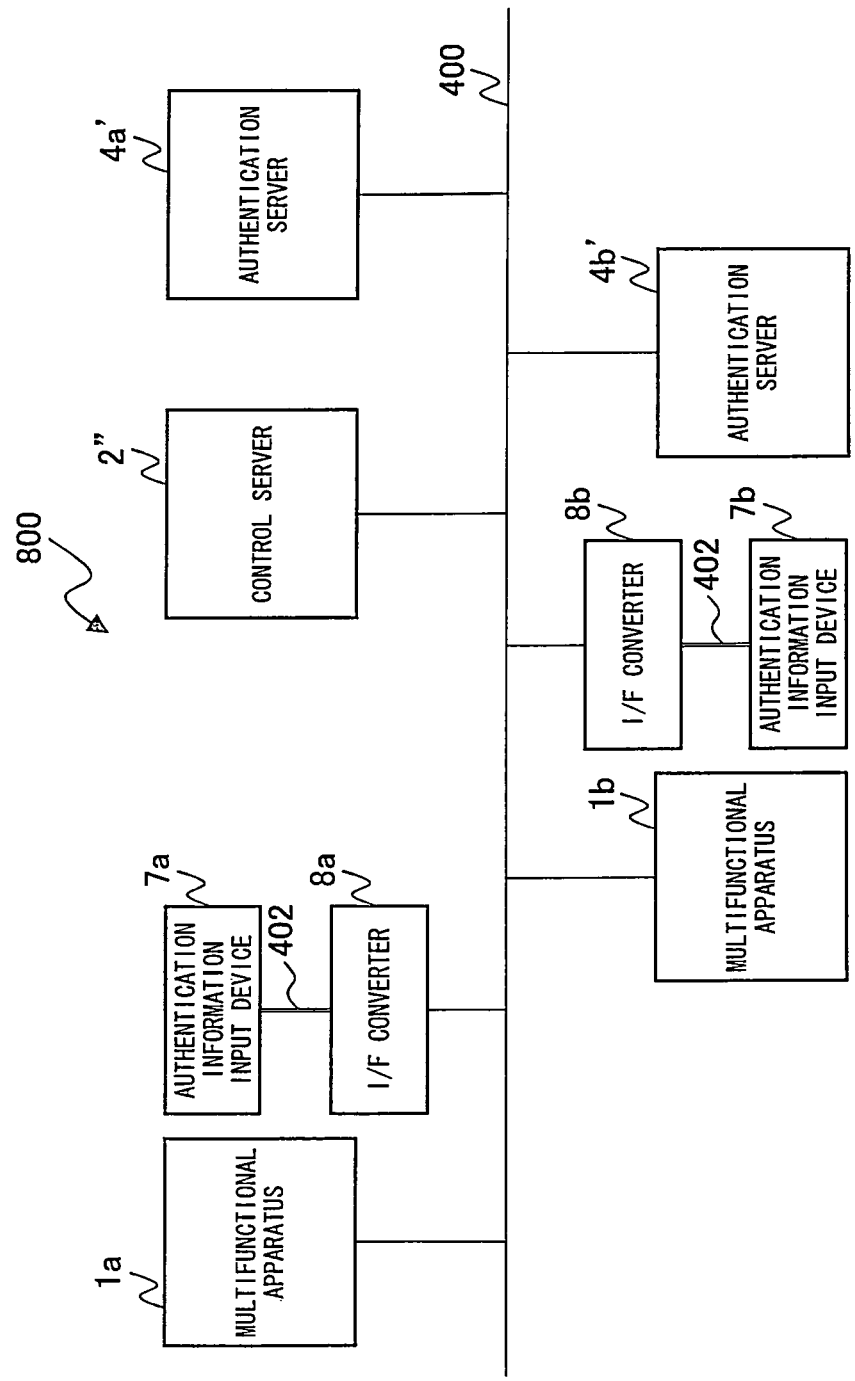
FIG. 27 shows a modified example of the present invention, and is a block diagram schematically showing an arrangement of a communication system.

FIG. 27 is a block diagram showing an arrangement of a communication system 800 of the present embodiment. The communication system 800 of the present embodiment is similar to the communication system 600 of Embodiment 2, and includes authentication servers 4a' and 4b' in addition to multifunctional apparatuses 1a and 1b, a control server 2", authentication information input devices 7a and 7b, and I/F converters 8a and 8b.

In the present embodiment, the control server 2" locks the multifunctional apparatuses 1a and 1b in the same manner as described above in Modified Example 1, but does not unlock the multifunctional apparatuses 1a and 1b. The authentication servers 4a and 4b unlock the multifunctional apparatuses 1a and 1b in accordance with authentication results, respectively. For this purpose, each of the authentication servers 4a and 4b includes a multifunctional apparatus control section (not shown).

The present embodiment is the same as Embodiment 2 to the extent that the control server 2" transmits, to the authentication server 4a or 4b, authentication information acquired from a user by controlling the authentication information input device 7a or 7b, and that the authentication server 4a or 4b authenticates the user in accordance with the authentication information thus received. However, the authentication server 4a or 4b then unlocks the multifunctional apparatus 1a or 1b in accordance with a result of the authentication.

Then, the multifunctional apparatus 1a or 1b, which has been unlocked, accepts various job execution instructions from the user with the scope of the execution authority of the user.

Even the arrangement of such a modified example can solve the conventional problems described above.

As described above, a control apparatus according to the present invention is a control apparatus capable of communicating via a network interface with (i) an imaging apparatus for executing a job including at least one of image formation and image processing and (ii) an authentication information acquisition device for acquiring, from a user, authentication information necessary for authentication, the control apparatus including: device driver means for controlling operation of the authentication information acquisition device via the network interface so that the authentication information acquisition device acquires authentication information; authentication information receiving means for receiving, from the authentication information acquisition device via the network interface, the authentication information acquired by the authentication information acquisition device; and operation control means for controlling the imaging apparatus in accordance with the authentication information received by the authentication information receiving means.

Further, a control method according to the present invention is a method for controlling, via an network interface, an imaging apparatus for executing a job including at least one of image formation and image processing and an authentication information acquisition device for acquiring, from a user, authentication information necessary for authentication, the method including: a device driver step of controlling operation of the authentication information acquisition device via the network interface so that the authentication information acquisition device acquires authentication information; an authentication information receiving step of receiving, from the authentication information acquisition device via the network interface, the authentication information acquired by the authentication information acquisition device; and an operation control step of controlling the imaging apparatus in accordance with the authentication information received by the authentication information receiving means.

Examples of the "image formation" include printing. Further, examples of the "image processing" include scanning of a document, facsimile, PC facsimile, image conversion, and image correction. Therefore, examples of the "imaging apparatus" include a printer, a copier, a facsimile machine, a PC facsimile machine, an image analysis apparatus, an image correction apparatus, a scanner, and a multifunctional apparatus.

According to the foregoing arrangement, the operation control means of the control apparatus controls the operation of the imaging apparatus via the network interface. Therefore, the imaging apparatus and the control apparatus that controls the operation of the imaging apparatus can be disposed in separate places. Meanwhile, the authentication information acquisition device is not controlled by the imaging apparatus as has conventionally been done, but is controlled by the device driver means of the control apparatus via the network interface. In this way, the authentication information acquisition device is controlled by the control apparatus separate from the imaging apparatus that processes a specific job. This makes it unnecessary to replace a substrate and ROM of the imaging apparatus in changing the arrangement of the authentication information acquisition device. This also makes it unnecessary to develop a device driver program for use in a special operating system dedicated to a system into which the imaging apparatus is incorporated. Therefore, a flexible authentication system can be built.

The imaging apparatus and the authentication information acquisition device do not need to communicate with each other. Since the imaging apparatus and the authentication information acquisition device are both controlled by the control apparatus, the imaging apparatus and the authentication information acquisition device do not need to communicate with each other.

Further, the control apparatus may be arranged so as to further include authenticating means for authenticating the user in accordance with the authentication information received by the authentication information receiving means, wherein the operation control means controls operation of the imaging apparatus in accordance with a result of authentication performed by the authenticating means.

According to the foregoing arrangement, the authenticating means of the control apparatus authenticates the user. Moreover, the operation of the imaging apparatus is controlled in accordance with the result of authentication performed by the authenticating means.

Further, the control may be arranged so as to further include: transmission destination storage section in which identification information for identifying the authentication information acquisition device and identification information for identifying an authentication server that authenticates the user in accordance with the authentication information are stored so as to be correlated with each other; device identifying means for identifying the authentication information acquisition device that has transmitted the authentication information to the authentication information receiving means; authentication information transmitting means (a) for acquiring, from the transmission destination storage section, the authentication server identification information corresponding to the identification information for identifying the authentication information acquisition device identified by the device identifying means, and (b) for transmitting, to the authentication sever indicated by the identification information thus acquired, the authentication information received by the authentication information receiving means; and authentication result receiving means for receiving a result of authentication of the user from the authentication server, wherein the operation control means controls operation of the imaging apparatus in accordance with the result of authentication received by the authentication result receiving means.

According to the foregoing arrangement, the authentication information received from the authentication information acquisition device is transmitted to the authentication server, and the authentication server authenticates the user. This makes it possible to reduce the load imposed on the control apparatus by the process of authenticating the user.

Furthermore, according to the foregoing arrangement, the control apparatus stores the identification information of the authentication information acquisition device and the identification information of the authentication server in the transmission destination storage section so that the two pieces of identification information are correlated with each other. As well, upon receiving authentication information, the control apparatus transmits the authentication information to an authentication server corresponding to an authentication information acquisition device from which the authentication information has been transmitted. Therefore, even in cases where there are a plurality of authentication information acquisition devices that acquire different types of authentication information, authentication information can be sorted and transmitted to appropriate authentication servers in accordance with the types of information, so that each of the authentication servers can appropriately perform an authentication process.

Further, the control apparatus is preferably arranged so as to include: a program storage section in which a plurality of device driver programs for controlling authentication information acquisition devices are stored; a driver correspondence storage section in which identification information for identifying the authentication information acquisition devices and identification information for identifying the device driver programs are stored with each other correlated; device identifying means for identifying the authentication information acquisition device that has transmitted the authentication information to the authentication information receiving means; and driver invoking means (i) for acquiring, from the driver correspondence storage section, device driver program identification information corresponding to the identification information for identifying the authentication information acquisition device identified by the device identifying means, (ii) for invoking, from the program storage section, a device driver program indicated by the identification information thus acquired, and (iii) for causing a computer to execute the device driver program, thereby operating the computer as the device driver means, wherein the computer controls operation of the authentication information acquisition device by executing the device driver program invoked by the driver invoking means.

According to the foregoing arrangement, even in cases where there are a plurality of authentication information acquisition devices that are controlled by different device driver programs, the driver invoking means chooses and activates an appropriate device driver program corresponding to an authentication information acquisition device that is to be controlled. This makes it possible to appropriately control an authentication information acquisition device regardless of the type of authentication information acquisition device.

Further, the control apparatus is preferably arranged so as to further include: a control destination storage section in which identification information for identifying the authentication information acquisition device and identification information for identifying the imaging apparatus are stored with each other correlated; and device identifying means for identifying the authentication information that has transmitted the authentication information to the authentication information receiving means, wherein the operation control means acquires, from the control destination storage section, the imaging apparatus identification information corresponding to the identification information for identifying the authentication information acquisition device identified by the device identifying means, and controls operation of the imaging apparatus indicated by the identification information thus acquired.

Even in cases where there are a plurality of imaging apparatuses, the foregoing arrangement shows which of the imaging apparatuses should be operated under the control of the operation control means of the control apparatus. Further, an imaging device to be controlled is determined in accordance with the authentication information acquisition device from which the authentication information has been transmitted. Therefore, an authentication information acquisition device to which authentication information is inputted can be correlated with an imaging apparatus whose operation is controlled by the authentication information.

Further, the control apparatus may be arranged such that: the authentication information acquisition device is capable of communicating with the control apparatus via an interface converter, the authentication information acquisition device and the interface converter being connected via a predetermined communication interface, the interface converter and the control apparatus being connected via the network interface; and the device driver means has (i) command generating means for generating first packet data describing, in accordance with a communication protocol of the predetermined communication interface, a control command for controlling operation of the authentication information acquisition device, (ii) packet converting means for creating second packet data by adding, to the first packet data, header information necessary for communication via the network interface, and (iii) command transmitting means for transmitting the second packet data to the interface converter; and the interface converter converts, into the first packet data, the second packet data received from the command transmitting means, and transmits the first packet data to the authentication information acquisition device.

Most of the authentication information acquisition devices distributed to the market are compatible only with USB connections or the like and incompatible with network connections. It is possible to connect such an authentication information acquisition device directly to the control apparatus by USB or the like. However, the constraints of cable length makes it necessary to dispose the control apparatus and the authentication information acquisition device within a predetermined distance from each other, thereby imposing limitations on the layout of the device.

According to the foregoing arrangement, the device driver means of the control apparatus can control the authentication information acquisition device via the network-compatible interface converter. This enables the control apparatus to remotely control a network-incompatible authentication information acquisition device distributed to the market. This enables the control apparatus to remotely control a network-incompatible authentication information acquisition device distributed to the market, thereby making it possible to freely design the layout of each device. As a result, it becomes possible, for example, to dispose an authentication information acquisition device beside an imaging apparatus and to control the device and apparatus from a remote place by a control apparatus.

Further, the control apparatus is preferably arranged such that the operation control means limits, in accordance with the authentication information received by the authentication information receiving means, whether or not the imaging apparatus executes the job.

The foregoing arrangement makes it possible to permit only a user who has succeeded in authentication to use the imaging apparatus.

Furthermore, the control apparatus is preferably arranged such that: the imaging apparatus is capable of executing a plurality of jobs different from each other; and the operation control means permits or prohibits, for each of the jobs in accordance with the authentication information received by the authentication information receiving means, the imaging apparatus to execute or from executing the job.

The foregoing arrangement makes it possible to limit available jobs in accordance with users.

Further, the control apparatus is preferably arranged such that the operation control means permits or prohibits, for each of a plurality of imaging apparatuses in accordance with the authentication information received by the authentication information receiving means, the imaging apparatus to execute or from executing the job, and controls the imaging apparatus so that when the imaging apparatus is permitted to execute the job, the imaging apparatus notifies the user that the imaging apparatus is permitted to execute the job.

According to the foregoing arrangement, an imaging apparatus permitted as a result of authentication to execute a job notifies the user that the imaging apparatus has been permitted to execute the job. Therefore, even in cases where there are provided a plurality of imaging apparatuses, the user can quickly find which of the imaging apparatuses has become available.

Further, the control apparatus is preferably arranged such that the operation control means controls the imaging apparatus so that a display section of the imaging apparatus displays the result obtained by authenticating the user in accordance with the authentication information received by the authentication information receiving means.

According to the foregoing arrangement, the display section of the imaging apparatus displays the authentication result. This enables the user to find whether the user has succeeded or failed in authentication.

Further, the control apparatus is preferably arranged such that the operation control means creates screen data of a display screen on which the result of authentication is displayed, and transmits the screen data to the imaging apparatus.

The foregoing arrangement makes it unnecessary for the imaging apparatus to retain the screen data of the display screen indicating the authentication result. Therefore, the imaging apparatus does not need to compress its own resources. Further, in cases where the control apparatus is arranged so as to control a plurality of imaging apparatuses, a saving in resource can be achieved by sharing data in common. Moreover, the display screen of each imaging apparatus to be controlled can be changed simply by updating the screen data of the control apparatus.

The control apparatus may be realized by hardware, or may be realized by causing a computer to execute a program. Specifically, a program according to the present invention operates a computer as each means of the control apparatus, and the program is stored in a storage medium according to the present invention. When a computer executes the program, the computer operates as each means of the control apparatus, thereby bringing about the same effects as the control apparatus.

In order to solve the foregoing problems, a communication system according to the present invention is a communication system including an imaging apparatus for executing a job including at least one of image formation and image processing; an authentication information acquisition device for acquiring, from a user, authentication information necessary for authentication, and a control apparatus capable of communicating with the imaging apparatus and the authentication information acquisition device via a network interface, the control apparatus including: device driver means for controlling operation of the authentication information acquisition device via the network interface so that the authentication information acquisition device acquires authentication information; authentication information receiving means for receiving, from the authentication information acquisition device via the network interface, the authentication information acquired by the authentication information acquisition device; and operation control means for controlling the imaging apparatus in accordance with the authentication information received by the authentication information receiving means.

According to the foregoing arrangement, the operation control means of the control apparatus controls the operation of the imaging apparatus via the network interface. Therefore, the imaging apparatus and the control apparatus that controls the operation of the imaging apparatus can be disposed in separate places. Meanwhile, the authentication information acquisition device is not controlled by the imaging apparatus as has conventionally been done, but is controlled by the device driver means of the control apparatus via the network interface. In this way, the authentication information acquisition device is controlled by the control apparatus separate from the imaging apparatus that processes a specific job. This makes it unnecessary to replace a substrate and ROM of the imaging apparatus in changing the arrangement of the authentication information acquisition device. This also makes it unnecessary to develop a device driver program for use in a special operating system dedicated to a system into which the imaging apparatus is incorporated. Therefore, a flexible authentication system can be built.

Further, the communication system is preferably arranged such that: the imaging apparatus includes (i) elemental job executing means for executing an elemental job including at least one of the image formation and the image processing, (ii) execution instruction receiving means for receiving, from the control apparatus, an instruction to execute a cooperation job obtained by combining elemental jobs that are executed by the elemental job executing means, (iii) first control command output means for outputting a first control command corresponding to the execution instruction received by the execution instruction receiving means, (iv) a command correspondence information storage section in which command correspondence information is stored so as to indicate a correspondence relationship between a first control command that is outputted by the first control command output means and a second control command receivable by the elemental job executing means, and (v) control command converting means for specifying, in accordance with the command correspondence information, a second control command corresponding to a first control command outputted from the first control command output means, and for outputting the specified second control command to the elemental job executing means; and the control apparatus includes execution instruction transmitting means for transmitting the execution instruction to the execution instruction receiving means of the imaging apparatus.

Examples of the elemental jobs include a scan job, a print job, an image processing job, and a network job. Moreover, examples of the cooperation job that is realized by executing an appropriate combination of these elemental jobs include: a copy job that is executed by a combination of the scan job, the image processing job, and the print job; and an image transmitting job that is executed by a combination of the scan job and the network job.

It should be noted here that executable elemental jobs vary depending on the type of imaging apparatus. For example, while there is a multifunctional apparatus A capable of executing only the scan job and the print job as elemental jobs, there is a multifunctional apparatus B capable of executing the copy job as an elemental job in addition to the scan job and the print job. In this case, the multifunctional apparatus A needs to execute the copy job as a cooperation job by a combination of the scan job and the print job, whereas the multifunctional apparatus B only needs to execute the copy job as an elemental job. Further, different types of multifunctional apparatus may have different elemental job executing means for executing identical elemental jobs.

It is difficult to make the elemental jobs common regardless of the type of imaging apparatus. This is because it is necessary to manufacture various types of imaging apparatus in accordance with users' needs. That is, an imaging apparatus usually includes elemental job executing means arranged so as to be unique to the imaging apparatus.

For the reasons set forth above, the second control command acceptable to the elemental job executing means varies depending on the type of imaging apparatus (that is, the second control command usually depends on the type of imaging apparatus).

However, according to the foregoing arrangement, the control command converting means accepts the first control command, specifies, from the command correspondence information storage section, the second control command corresponding to the first control command, and outputs the specified second control command to the elemental job executing means. With this, even when the second control command depends on the type of imaging apparatus as described above, the first control command acceptable to the control command converting means can be made independent of the type of imaging apparatus (i.e., can be made common to all imaging apparatuses).

With this, in cases where an external control apparatus controls an imaging apparatus, the control apparatus only needs to output, to the imaging apparatus, either a first control command independent of the type of imaging apparatus or a control instruction on which the first control command is based. As a result, it is only necessary to develop a control apparatus so that even in cases where the control apparatus performs new control with respect to an imaging apparatus, the control apparatus creates either a first control command common regardless of the type of imaging apparatus or a control instruction on which the first control command is based. This makes it easy to improve efficiency in development of the control apparatus.

Further, the communication system is preferably arranged such that: the operation control means of the control apparatus creates screen data of a display screen that shows a result obtained by authenticating the user in accordance with the authentication information received by the authentication information receiving means, and transmits the screen data to the imaging apparatus; and the imaging apparatus includes (i) a display section and (ii) UI control means for receiving the screen data from the operation control means of the control apparatus, and for causing the display section to display the display screen corresponding to the screen data thus received.

The foregoing arrangement makes it unnecessary for the imaging apparatus to retain the screen data of the display screen indicating the authentication result. Therefore, the imaging apparatus does not need to compress its own resources. Further, in cases where the control apparatus is arranged so as to control a plurality of imaging apparatuses, a saving in resource can be achieved by sharing data in common. Moreover, the display screen of each imaging apparatus to be controlled can be changed simply by updating the screen data of the control apparatus.

Further, the communication system is preferably arranged so as to further include an authentication server for authenticating the user in accordance with the authentication information, wherein: the control apparatus further includes (i) transmission destination storage section in which identification information for identifying the authentication information acquisition device and identification information for identifying the authentication server are stored so as to be correlated with each other, (ii) device identifying means for identifying the authentication information acquisition device that has transmitted the authentication information to the authentication information receiving means, (iii) authentication information transmitting means (a) for acquiring, from the transmission destination storage section, the authentication server identification information corresponding to the identification information for identifying the authentication information acquisition device identified by the device identifying means, and (b) for transmitting, to the authentication sever indicated by the identification information thus acquired, the authentication information received by the authentication information receiving means, and (iv) authentication result receiving means for receiving a result of authentication of the user from the authentication server; and the operation control means controls operation of the imaging apparatus in accordance with the result of authentication received by the authentication result receiving means.

According to the foregoing arrangement, the authentication information received from the authentication information acquisition device is transmitted to the authentication server, and the authentication server authenticates the user. This makes it possible to reduce the load imposed on the control apparatus by the process of authenticating the user.

Furthermore, according to the foregoing arrangement, the control apparatus stores the identification information of the authentication information acquisition device and the identification information of the authentication server in the transmission destination storage section so that the two pieces of identification information are correlated with each other. As well, upon receiving authentication information, the control apparatus transmits the authentication information to an authentication server corresponding to an authentication information acquisition device from which the authentication information has been transmitted. Therefore, even in cases where there are a plurality of authentication information acquisition devices that acquire different types of authentication information, authentication information can be sorted and transmitted to appropriate authentication servers in accordance with the types of information, so that each of the authentication servers can appropriately perform an authentication process.

Further, the communication system is preferably arranged so as to further include an interface converter, wherein: the authentication information acquisition device is capable of communicating with the control apparatus via the interface converter, the authentication information acquisition device and the interface converter being connected via a predetermined communication interface, the interface converter and the control apparatus being connected via the network interface; and the device driver means has (i) command generating means for generating first packet data describing, in accordance with a communication protocol of the predetermined communication interface, a control command for controlling operation of the authentication information acquisition device, (ii) packet converting means for creating second packet data by adding, to the first packet data, header information necessary for communication via the network interface, and (iii) command transmitting means for transmitting the second packet data to the interface converter; and the interface converter converts, into the first packet data, the second packet data received from the command transmitting means, and transmits the first packet data to the authentication information acquisition device.

According to the foregoing arrangement, the device driver means of the control apparatus can control the authentication information acquisition device via the network-compatible interface converter. This enables the control apparatus to remotely control a network-incompatible authentication information acquisition device distributed to the market, thereby making it possible to freely design the layout of each device. As a result, it becomes possible, for example, to dispose an authentication information acquisition device beside an imaging apparatus and to control the device and apparatus from a remote place by a control apparatus.

Further, another communication system according to the present invention is a communication system including an imaging apparatus for executing a job including at least one of image formation and image processing, an authentication information acquisition device for acquiring, from a user, authentication information necessary for authentication, an authentication server capable of communicating with the imaging apparatus via a network interface, and a control apparatus capable of communicating with the authentication information acquisition device and the authentication server via the network interface, the control apparatus including: device driver means for controlling operation of the authentication information acquisition device via the network interface so that the authentication information acquisition device acquires authentication information; authentication information receiving means for receiving, from the authentication information acquisition device via the network interface, the authentication information acquired by the authentication information acquisition device; and authentication information transmitting means for transmitting, to the authentication server, the authentication information received by the authentication information receiving means, the authentication server including: authenticating means for authenticating the user in accordance with the authentication information received from the control apparatus; and operation control means for controlling the imaging apparatus in accordance with a result of authentication performed by the authenticating means.

According to the foregoing arrangement, the operation control means of the control apparatus controls the operation of the imaging apparatus via the network interface. Therefore, the imaging apparatus and the control apparatus that controls the operation of the imaging apparatus can be disposed in separate places. Meanwhile, the authentication information acquisition device is not controlled by the imaging apparatus as has conventionally been done, but is controlled by the device driver means of the control apparatus via the network interface. In this way, the authentication information acquisition device is controlled by the control apparatus separate from the imaging apparatus that processes a specific job. This makes it unnecessary to replace a substrate and ROM of the imaging apparatus in changing the arrangement of the authentication information acquisition device. This also makes it unnecessary to develop a device driver program for use in a special operating system dedicated to a system into which the imaging apparatus is incorporated. Therefore, a flexible authentication system can be built.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A control apparatus configured to communicate via a network interface with (i) an imaging apparatus for executing a job including at least one of image formation and image processing and (ii) a plurality of authentication information acquisition devices for acquiring, from a user, authentication information necessary for authentication, the control apparatus comprising:

device driver means for controlling operation of the authentication information acquisition devices via the network interface so that a selected one of the authentication information acquisition devices acquires the authentication information;

authentication information receiving means for receiving, from the selected authentication information acquisition device via the network interface, the authentication information acquired by the selected authentication information acquisition device;

operation control means for controlling the imaging apparatus in accordance with the authentication information received by the authentication information receiving means;

transmission destination storage section in which identification information for identifying the selected authentication information acquisition device and identification information for identifying a selected one of a plurality of authentication servers that authenticates the user in accordance with the authentication information are stored so as to be correlated with each other;

device identifying means for identifying the selected authentication information acquisition device that has transmitted the authentication information to the authentication information receiving means;

authentication information transmitting means (a) for acquiring, from the transmission destination storage section, the authentication server identification information corresponding to the identification information for identifying the selected authentication information acquisition device identified by the device identifying means, and (b) for transmitting, to the selected authentication server indicated by the identification information thus acquired, the authentication information received by the authentication information receiving means; and authentication result receiving means for receiving a result of authentication of the user from the selected authentication server, wherein the operation control means controls operation of the imaging apparatus in accordance with the result of authentication received by the authentication result receiving means.

2. The control apparatus as set forth in claim 1, wherein the imaging apparatus and the authentication information acquisition device are only in communication with each other indirectly via the network interface of the control apparatus.

3. The control apparatus as set forth in claim 1, further comprising authenticating means for authenticating the user in accordance with the authentication information received by the authentication information receiving means, wherein
the operation control means controls operation of the imaging apparatus in accordance with a result of authentication performed by the authenticating means.

4. The control apparatus as set forth in claim 3, wherein the operation control means controls the imaging apparatus so that a display section of the imaging apparatus displays the result obtained by authenticating the user in accordance with the authentication information received by the authentication information receiving means.

5. The control apparatus as set forth in claim 4, wherein the operation control means creates screen data of a display screen on which the result of authentication is displayed, and transmits the screen data to the imaging apparatus.

6. The control apparatus as set forth in claim 1, further comprising:

a program storage section in which a plurality of device driver programs for controlling authentication information acquisition devices are stored;

a driver correspondence storage section in which identification information for identifying the authentication information acquisition devices and identification information for identifying the device driver programs are stored with each other correlated;

device identifying means for identifying the authentication information acquisition device that has transmitted the authentication information to the authentication information receiving means; and driver invoking means (i) for acquiring, from the driver correspondence storage section, the device driver program identification information corresponding to the identification information for identifying the authentication information acquisition device identified by the device identifying means, (ii) for invoking, from the program storage section, a device driver program indicated by the identification information thus acquired, and (iii) for causing a computer to execute the device driver program, thereby operating the computer as the device driver means, wherein the computer controls operation of the authentication information acquisition device by executing the device driver program invoked by the driver invoking means.

7. The control apparatus as set forth in claim 1, further comprising:

a control destination storage section in which identification information for identifying the authentication information acquisition device and identification information for identifying the imaging apparatus are stored with each other correlated; and device identifying means for identifying the authentication information acquisition device that has transmitted the authentication information to the authentication information receiving means, wherein the operation control means acquires, from the control destination storage section, the imaging apparatus identification information corresponding to the identification information for identifying the authentication information acquisition device identified by the device identifying means, and controls operation of the imaging apparatus indicated by the identification information thus acquired.

8. The control apparatus as set forth in claim 1, wherein:
the authentication information acquisition device is configured to communicate with the control apparatus via an interface converter, the authentication information acquisition device and the interface converter being connected via a predetermined communication interface, the interface converter and the control apparatus being connected via the network interface; and
the device driver means has (i) command generating means for generating first packet data describing, in accordance with a communication protocol of the predetermined communication interface, a control command for controlling operation of the authentication information acquisition device, (ii) packet converting means for creating second packet data by adding, to the first packet data, header information necessary for communication via the network interface, and (iii) command transmitting means for transmitting the second packet data to the interface converter; and
the interface converter converts, into the first packet data, the second packet data received from the command transmitting means, and transmits the first packet data to the authentication information acquisition device.

9. The control apparatus as set forth in claim 1, wherein the operation control means limits, in accordance with the authentication information received by the authentication information receiving means, whether or not the imaging apparatus executes the job.

10. The control apparatus as set forth in claim 9, wherein:
the imaging apparatus is configured to execute a plurality of jobs different from each other; and
the operation control means permits or prohibits, for each of the jobs in accordance with the authentication information received by the authentication information receiving means, the imaging apparatus to execute or from executing the job.

11. The control apparatus as set forth in claim 9, wherein the operation control means permits or prohibits, for each of a plurality of imaging apparatuses in accordance with the authentication information received by the authentication information receiving means, the imaging apparatus to execute or from executing the job, and controls the imaging apparatus so that when the imaging apparatus is permitted to execute the job, the imaging apparatus notifies the user that the imaging apparatus is permitted to execute the job.

12. The control apparatus as set forth in claim 1, wherein the operation control means controls the imaging apparatus so that a display section of the imaging apparatus displays the result obtained by authenticating the user in accordance with the authentication information received by the authentication information receiving means.

13. The control apparatus as set forth in claim 12, wherein the operation control means creates screen data of a display screen on which the result of authentication is displayed, and transmits the screen data to the imaging apparatus.

14. A communication system, comprising:
an imaging apparatus for executing a job including at least one of image formation and image processing;
a plurality of authentication information acquisition devices for acquiring, from a user, authentication information necessary for authentication, and
a control apparatus configured to communicate with the imaging apparatus and a selected one of the authentication information acquisition devices via a network interface,
the control apparatus comprising:
device driver means for controlling operation of the authentication information acquisition devices via the network interface so that the selected authentication information acquisition device acquires authentication information;
authentication information receiving means for receiving, from the selected authentication information acquisition device via the network interface, the authentication information acquired by the selected authentication information acquisition device;
operation control means for controlling the imaging apparatus in accordance with the authentication information received by the authentication information receiving means;
transmission destination storage section in which identification information for identifying the selected authentication information acquisition device and identification information for identifying a selected one of a plurality of authentication servers that authenticates the user in accordance with the authentication information are stored so as to be correlated with each other;
device identifying means for identifying the selected authentication information acquisition device that has transmitted the authentication information to the authentication information receiving means;
authentication information transmitting means (a) for acquiring, from the transmission destination storage section, the authentication server identification information corresponding to the identification information for identifying the selected authentication information acquisition device identified by the device identifying means, and (b) for transmitting, to the selected authentication server indicated by the identification information thus acquired, the authentication information received by the authentication information receiving means; and
authentication result receiving means for receiving a result of authentication of the user from the selected authentication server, wherein
the operation control means controls operation of the imaging apparatus in accordance with the result of authentication received by the authentication result receiving means.

15. The communication system as set forth in claim 14, wherein:
the imaging apparatus includes (i) elemental job executing means for executing an elemental job including at least one of the image formation and the image processing, (ii) execution instruction receiving means for receiving, from the control apparatus, an instruction to execute a cooperation job obtained by combining elemental jobs that are executed by the elemental job executing means, (iii) first control command output means for outputting a first control command corresponding to the execution instruction received by the execution instruction receiving means, (iv) a command correspondence information storage section in which command correspondence information is stored so as to indicate a correspondence relationship between a first control command that is outputted by the first control command output means and a second control command receivable by the elemental job executing means, and (v) control command converting means for specifying, in accordance with the command correspondence information, a second control command corresponding to a first control command outputted from the first control command output means, and for outputting the specified second control command to the elemental job executing means; and the control apparatus includes execution instruction transmitting means for transmitting the execution instruction to the execution instruction receiving means of the imaging apparatus.

16. The communication system as set forth in claim 14, wherein:

the operation control means of the control apparatus creates screen data of a display screen that shows a result obtained by authenticating the user in accordance with the authentication information received by the authentication information receiving means, and transmits the screen data to the imaging apparatus; and the imaging apparatus includes (i) a display section and (ii) UI control means for receiving the screen data from the operation control means of the control apparatus, and for causing the display section to display the display screen corresponding to the screen data thus received.

17. The communication system as set forth in claim 14, further comprising an authentication server for authenticating the user in accordance with the authentication information, wherein:

the control apparatus further includes (i) transmission destination storage section in which identification information for identifying the authentication information acquisition device and identification information for identifying the authentication server are stored so as to be correlated with each other, (ii) device identifying means for identifying the authentication information acquisition device that has transmitted the authentication information to the authentication information receiving means, (iii) authentication information transmitting means (a) for acquiring, from the transmission destination storage section, the authentication server identification information corresponding to the identification information for identifying the authentication information acquisition device identified by the device identifying means, and (b) for transmitting, to the authentication server indicated by the identification information thus acquired, the authentication information received by the authentication information receiving means, and (iv) authentication result receiving means for receiving a result of authentication of the user from the authentication server; and the operation control means controls operation of the imaging apparatus in accordance with the result of authentication received by the authentication result receiving means.

18. The communication system as set forth in claim 14, further comprising an interface converter, wherein:

the authentication information acquisition device is configured to communicate with the control apparatus via the interface converter, the authentication information acquisition device and the interface converter being connected via a predetermined communication interface, the interface converter and the control apparatus being connected via the network interface; and the device driver means has (i) command generating means for generating first packet data describing, in accordance with a communication protocol of the predetermined communication interface, a control command for controlling operation of the authentication information acquisition device, (ii) packet converting means for creating second packet data by adding, to the first packet data, header information necessary for communication via the network interface, and (iii) command transmitting means for transmitting the second packet data to the interface converter; and the interface converter converts, into the first packet data, the second packet data received from the command transmitting means, and transmits the first packet data to the authentication information acquisition device.

19. A communication system including an imaging apparatus for executing a job including at least one of image formation and image processing, a plurality of authentication information acquisition devices for acquiring, from a user, authentication information necessary for authentication, a plurality of authentication servers configured to communicate with the imaging apparatus via a network interface, and a control apparatus configured to communicate with the authentication information acquisition devices and the authentication servers via the network interface, the control apparatus comprising:

device driver means for controlling operation of the authentication information acquisition devices via the network interface so that a selected one of the authentication information acquisition devices acquires the authentication information;

authentication information receiving means for receiving, from the selected authentication information acquisition device via the network interface, the authentication information acquired by the selected authentication information acquisition device;

authentication information transmitting means for transmitting, to a selected one of the authentication servers, the authentication information received by the authentication information receiving means;

transmission destination storage section in which identification information for identifying the selected authentication information acquisition device and identification information for identifying the selected authentication server that authenticates the user in accordance with the authentication information are stored so as to be correlated with each other;

device identifying means for identifying the selected authentication information acquisition device that has transmitted the authentication information to the authentication information receiving means;

authentication information transmitting means (a) for acquiring, from the transmission destination storage section, the authentication server identification information corresponding to the identification information for identifying the selected authentication information acquisition device identified by the device identifying means, and (b) for transmitting, to the selected authentication server indicated by the identification information thus acquired, the authentication information received by the authentication information receiving means; and authentication result receiving means for receiving a result of authentication of the user from the selected authentication server, wherein the operation control means controls operation of the imaging apparatus in accordance with the result of authentication received by the authentication result receiving means, the selected authentication server comprising:
- authenticating means for authenticating the user in accordance with the authentication information received from the control apparatus; and
- operation control means for controlling the imaging apparatus in accordance with a result of authentication performed by the authenticating means.

20. A method for controlling, via a network interface, an imaging apparatus for executing a job including at least one of image formation and image processing and a plurality of authentication information acquisition devices for acquiring, from a user, authentication information necessary for authentication, the method comprising:
- a device driver step of controlling operation of the authentication information acquisition devices via the network interface so that a selected one of the authentication information acquisition devices acquires authentication information;
- an authentication information receiving step of receiving, from the selected authentication information acquisition device via the network interface, the authentication information acquired by the selected authentication information acquisition device;
- an operation control step of controlling the imaging apparatus in accordance with the authentication information received in the authentication information receiving step;
- a transmission destination storage step in which identification information for identifying the selected authentication information acquisition device and identification information for identifying a selected one of a plurality of authentication servers that authenticates the user in accordance with the authentication information are stored so as to be correlated with each other;
- a device identifying step for identifying the selected authentication information acquisition device that has transmitted the authentication information in the authentication information receiving step;
- an authentication information transmitting step (a) for acquiring the authentication server identification information corresponding to the identification information for identifying the selected authentication information acquisition device identified in the device identifying step, and (b) for transmitting, to the selected authentication server indicated by the identification information thus acquired, the authentication information received in the authentication information receiving step; and
- an authentication result receiving step for receiving a result of authentication of the user from the selected authentication server, wherein
- the operation control means controls operation of the imaging apparatus in accordance with the result of authentication received in the authentication result receiving step.

21. A non-transitory computer-readable storage medium for storing a program for operating a computer as means of a control apparatus configured to communicate via a network interface with (i) an imaging apparatus for executing a job including at least one of image formation and image processing and (ii) a plurality of authentication information acquisition devices for acquiring, from a user, authentication information necessary for authentication, the control apparatus including:
- device driver means for controlling operation of the authentication information acquisition devices via the network interface so that a selected one of the authentication information acquisition devices acquires authentication information;
- authentication information receiving means for receiving, from the selected authentication information acquisition device via the network interface, the authentication information acquired by the selected authentication information acquisition device;
- operation control means for controlling the imaging apparatus in accordance with the authentication information received by the authentication information receiving means;
- transmission destination storage section in which identification information for identifying the selected authentication information acquisition device and identification information for identifying a selected one of a plurality of authentication servers that authenticates the user in accordance with the authentication information are stored so as to be correlated with each other;
- device identifying means for identifying the selected authentication information acquisition device that has transmitted the authentication information to the authentication information receiving means;
- authentication information transmitting means (a) for acquiring, from the transmission destination storage section, the authentication server identification information corresponding to the identification information for identifying the selected authentication information acquisition device identified by the device identifying means, and (b) for transmitting, to the selected authentication server indicated by the identification information thus acquired, the authentication information received by the authentication information receiving means; and
- authentication result receiving means for receiving a result of authentication of the user from the selected authentication server, wherein
- the operation control means controls operation of the imaging apparatus in accordance with the result of authentication received by the authentication result receiving means.

* * * * *